(12) United States Patent
Ichimura

(10) Patent No.: US 7,963,834 B2
(45) Date of Patent: Jun. 21, 2011

(54) GAME DEVICE, GAME ADVANCING METHOD, PROGRAM, AND RECORDING MEDIUM

(75) Inventor: Ryutaro Ichimura, Kanagawa (JP)

(73) Assignee: Square Enix Co., Ltd., Tokyo (JP)

( * ) Notice: Subject to any disclaimer, the term of this patent is extended or adjusted under 35 U.S.C. 154(b) by 55 days.

(21) Appl. No.: 11/952,504

(22) Filed: Dec. 7, 2007

(65) Prior Publication Data

US 2008/0200226 A1 Aug. 21, 2008

(30) Foreign Application Priority Data

Dec. 11, 2006 (JP) ................................ P2006-333769

(51) Int. Cl.
*A63F 13/00* (2006.01)
*A63F 9/24* (2006.01)

(52) U.S. Cl. ...................... 463/8; 463/1; 463/30; 463/31

(58) Field of Classification Search ................ 463/1, 30, 463/31, 8
See application file for complete search history.

(56) References Cited

U.S. PATENT DOCUMENTS

| | | | | |
|---|---|---|---|---|
| 5,390,937 | A | * | 2/1995 | Sakaguchi et al. ................. 463/7 |
| 5,649,862 | A | * | 7/1997 | Sakaguchi et al. ............. 463/44 |
| 6,117,014 | A | | 9/2000 | Aoyama et al. |
| 6,210,273 | B1 | * | 4/2001 | Matsuno ............................ 463/8 |
| 6,270,416 | B1 | * | 8/2001 | Komoto .......................... 463/43 |
| 6,419,577 | B1 | * | 7/2002 | Okada et al. ....................... 463/1 |
| RE37,948 | E | * | 12/2002 | Sakaguchi et al. ............. 463/43 |
| 6,554,702 | B2 | * | 4/2003 | Mahar et al. .................... 463/11 |
| 6,884,169 | B2 | * | 4/2005 | Tsuchida et al. ................ 463/31 |
| 7,066,817 | B2 | * | 6/2006 | Sato ................................ 463/30 |
| 7,223,174 | B2 | * | 5/2007 | Machida ......................... 463/43 |
| D566,195 | S | * | 4/2008 | Ichimura et al. ............. D21/325 |
| D573,658 | S | * | 7/2008 | Ichimura et al. ............. D21/325 |
| 7,435,170 | B2 | * | 10/2008 | Karashima et al. ............... 463/8 |
| 7,540,805 | B2 | * | 6/2009 | Takeda et al. ................... 463/30 |
| D618,284 | S | * | 6/2010 | Ichimura et al. ............. D21/325 |
| D618,285 | S | * | 6/2010 | Ichimura et al. ............. D21/325 |

(Continued)

FOREIGN PATENT DOCUMENTS

JP 7-121293 5/1995

(Continued)

OTHER PUBLICATIONS

English language Abstract of JP 2003-71122, Mar. 11, 2003.

(Continued)

*Primary Examiner* — David L Lewis
*Assistant Examiner* — William H McCulloch
(74) *Attorney, Agent, or Firm* — Greenblum & Bernstein, P.L.C.

(57) ABSTRACT

A game apparatus executes a game in which a player character and an enemy character fight against each other. The game apparatus includes an attack determiner that determines whether the player character has an attack turn. When the attack determiner determines that the player character has an attack turn, an attack technique selector enables a player to select a desired attack technique to be executed by the player character. A selection time value accumulator accumulates a selection time value that corresponds to a shortness of time until the attack technique is selected by the player. When the selection time value exceeds a predetermined value, the attack technique selector enables the player to select a special attack to be selected by the player as the attack technique.

18 Claims, 9 Drawing Sheets

U.S. PATENT DOCUMENTS

| | | | |
|---|---|---|---|
| 7,819,731 B2* | 10/2010 | Suzuki | 463/1 |
| 2002/0013172 A1* | 1/2002 | Kaku et al. | 463/32 |
| 2002/0045470 A1* | 4/2002 | Atsumi et al. | 463/1 |
| 2002/0107060 A1* | 8/2002 | Ohnuma et al. | 463/7 |
| 2002/0142848 A1* | 10/2002 | Tsuchida et al. | 463/43 |
| 2002/0147039 A1* | 10/2002 | Mahar et al. | 463/11 |
| 2002/0151337 A1* | 10/2002 | Yamashita et al. | 463/8 |
| 2002/0187837 A1* | 12/2002 | Hasebe et al. | 463/43 |
| 2003/0040364 A1* | 2/2003 | Yabe et al. | 463/43 |
| 2003/0060248 A1* | 3/2003 | Yamashita | 463/1 |
| 2004/0005921 A1* | 1/2004 | Shinoda | 463/29 |
| 2004/0259614 A1* | 12/2004 | Machida | 463/1 |
| 2004/0259617 A1* | 12/2004 | Machida | 463/5 |
| 2005/0014543 A1* | 1/2005 | Itoi et al. | 463/8 |
| 2006/0035693 A1* | 2/2006 | Kobaysahi et al. | 463/8 |
| 2006/0183521 A1* | 8/2006 | Hamamoto | 463/8 |
| 2006/0183543 A1* | 8/2006 | Yagi | 463/31 |
| 2007/0060234 A1* | 3/2007 | Yamada et al. | 463/8 |
| 2007/0265046 A1* | 11/2007 | Sato | 463/8 |
| 2008/0200226 A1* | 8/2008 | Ichimura | 463/8 |
| 2009/0325707 A1* | 12/2009 | Ichimura | 463/40 |
| 2010/0273554 A1* | 10/2010 | Leftwich et al. | 463/31 |
| 2010/0279768 A1* | 11/2010 | Huang et al. | 463/31 |
| 2010/0304854 A1* | 12/2010 | McEldowney | 463/30 |
| 2010/0304856 A1* | 12/2010 | Coleman et al. | 463/31 |
| 2010/0311483 A1* | 12/2010 | Fields et al. | 463/2 |
| 2011/0028194 A1* | 2/2011 | Tang et al. | 463/1 |

FOREIGN PATENT DOCUMENTS

| | | |
|---|---|---|
| JP | 11-151382 | 6/1999 |
| JP | 2003-71122 | 3/2003 |
| JP | 2004-121746 | 4/2004 |
| JP | 2004-249057 | 9/2004 |
| KR | 10-2006-0050810 | 5/2006 |
| KR | 10-2006-0107845 | 10/2006 |
| KR | 10-2008-0015514 | 2/2008 |

OTHER PUBLICATIONS

English language Abstract of JP 11-151382, Jun. 8, 1999.
English language Abstract of JP 2004-121746, Apr. 22, 2004.
English language Abstract of JP 2004-249057, Sep. 9, 2004.
English language Abstract of KR 10-2006-0050810 (May 19, 2006).
English language Abstract of KR 10-2006-0107845 (Oct. 16, 2006).
English language Abstract of KR 10-2008-0015514 (Feb. 19, 2008).
English language Abstract of JP 7-121293.

* cited by examiner

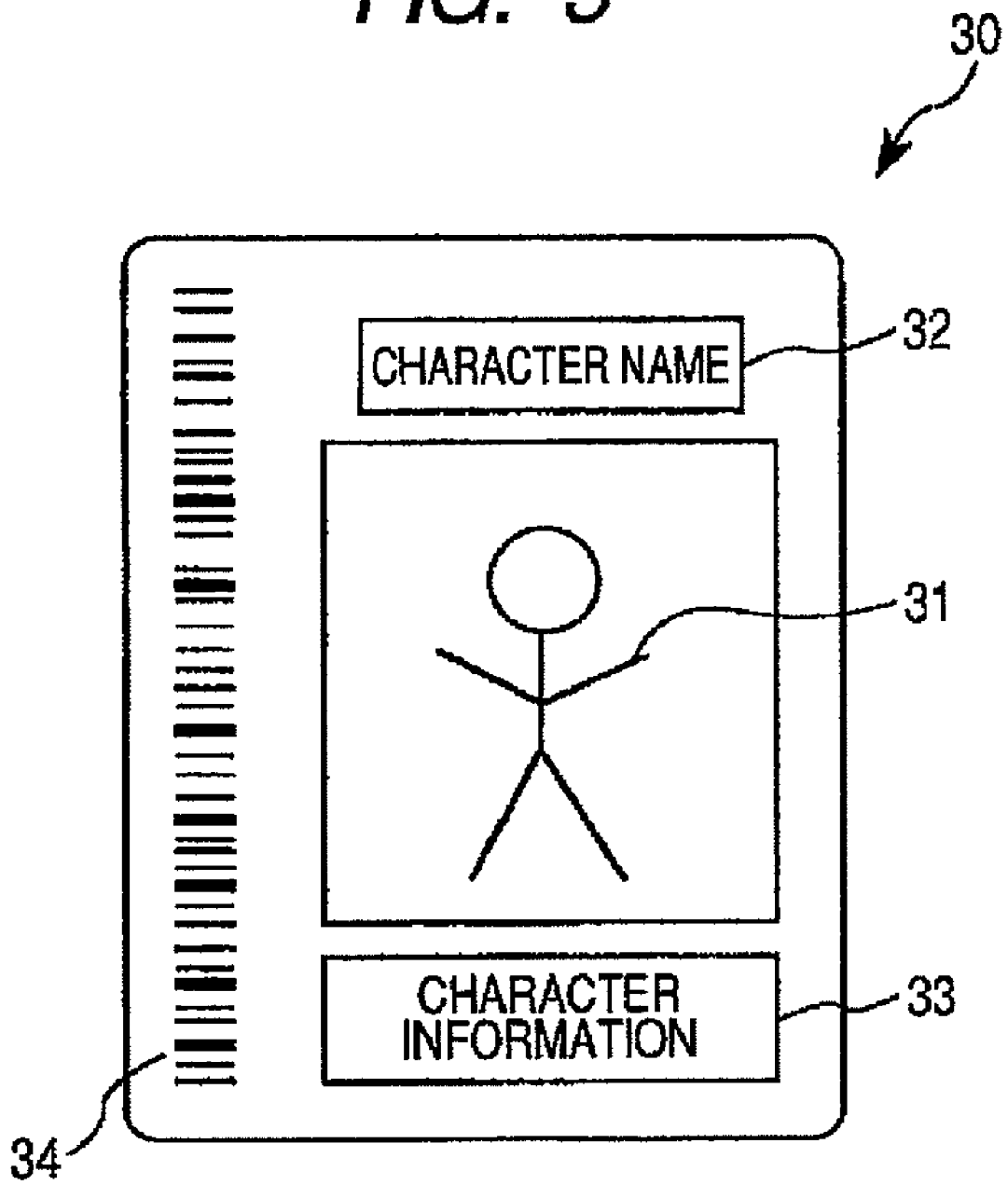

FIG. 5A

| PLAYER CHARACTER 1 | HP | CAPABILITY VALUE | ATTRIBUTE | ATTACK TECHNIQUE A | ATTACK TECHNIQUE B |
|---|---|---|---|---|---|
| PLAYER CHARACTER 2 | HP | CAPABILITY VALUE | ATTRIBUTE | ATTACK TECHNIQUE A | ATTACK TECHNIQUE B |
| PLAYER CHARACTER 3 | HP | CAPABILITY VALUE | ATTRIBUTE | ATTACK TECHNIQUE A | ATTACK TECHNIQUE B |
| 51 | 52 | 53 | 54 | 55 | 56 |

⇩ 50'

| SPECIAL CHARACTER | HP | CAPABILITY VALUE | ATTRIBUTE | ATTACK TECHNIQUE A | ATTACK TECHNIQUE B |
|---|---|---|---|---|---|
| 51 | 52 | 53 | 54 | 55 | 56 |

FIG. 5B

| ENEMY CHARACTER 1 | HP | CAPABILITY VALUE | ATTRIBUTE | ATTACK TECHNIQUE |
|---|---|---|---|---|
| ENEMY CHARACTER 2 | HP | CAPABILITY VALUE | ATTRIBUTE | ATTACK TECHNIQUE |
| ENEMY CHARACTER 3 | HP | CAPABILITY VALUE | ATTRIBUTE | ATTACK TECHNIQUE |
| 61 | 62 | 63 | 64 | 65 |

FIG. 5C

| STAGE No. | 71 |
|---|---|
| COURAGE POINT | 72 |
| ATTACK TURN | 73 |
| CALL FLAG | 74 |

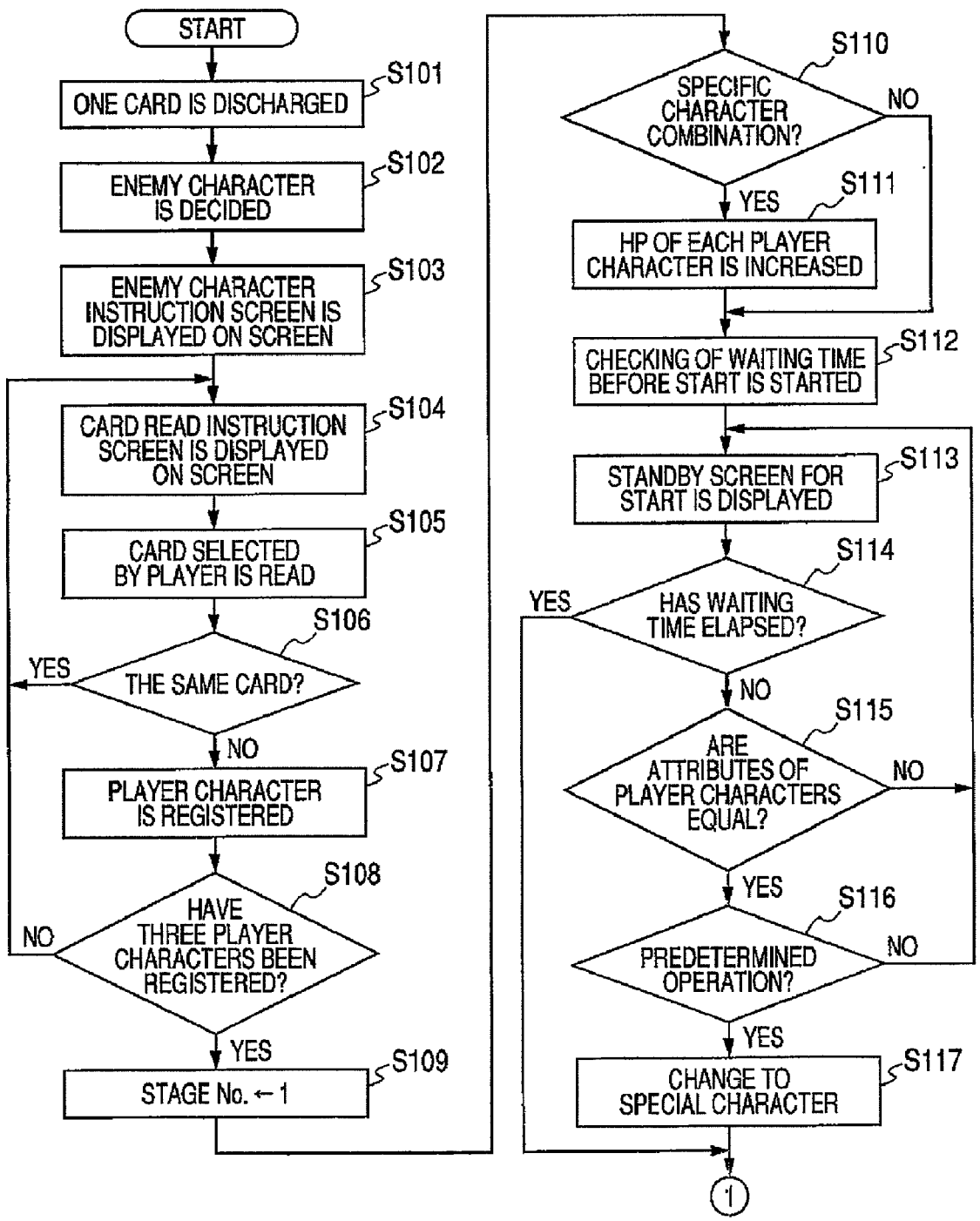

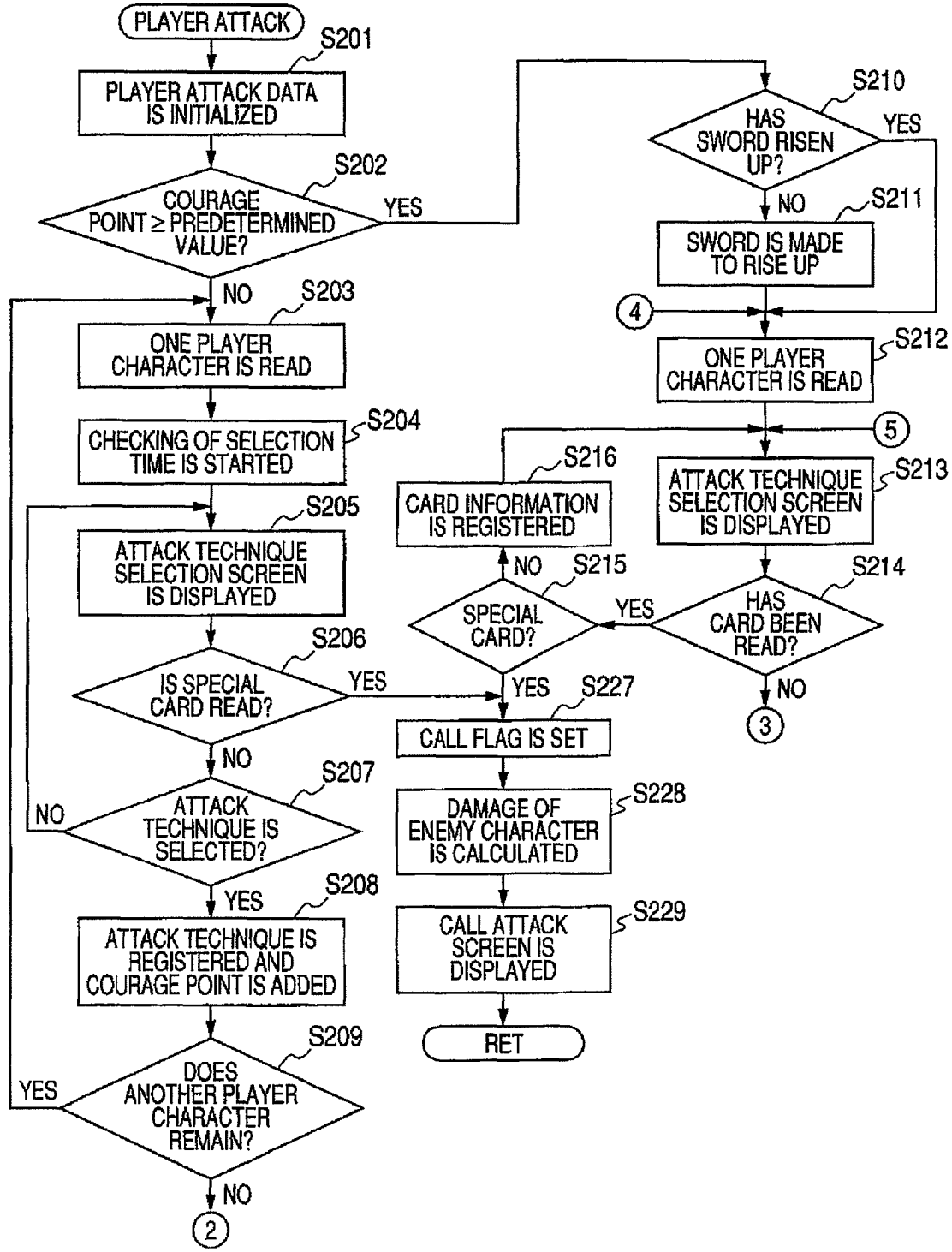

GAME DEVICE, GAME ADVANCING METHOD, PROGRAM, AND RECORDING MEDIUM

CROSS REFERENCE TO RELATED APPLICATION

The present disclosure relates to subject matter contained in Japanese Patent Application No. 2006-333769, filed on Dec. 11, 2006, the disclosure of which is expressly incorporated herein by reference in its entirety.

BACKGROUND OF THE INVENTION

1. Field of the Invention

The present invention relates to a game apparatus and the like that advance by making a player character and an enemy character fight against each other. The invention more particularly relates to a game apparatus suitable for an arcade game machine.

2. Description of the Related Art

In recent years, a trading card game (hereinafter, simply referred to a card game) among arcade games installed in a public space, such as a game center, is particularly popular. In such a card game, a character appearing in a game is decided according to a card that a person who plays the game owns. For this reason, not only pleasure of simply playing a game but also pleasure of collecting a card used in the game is expected. In addition, a battle play between friends having cards used in the same game is also a kind of pleasure.

Assuming that a point of view of a charging method is excluded, fun of a game itself is largely influenced rather by types of cards on hand and it does not make a big difference whether an arcade game machine is used as a platform or a home video game machine is used as the platform. Here, there was a card game realized by using a home video game machine, in which data included in a card is read by a bar code and a player character and an enemy character are made to fight against each other according to the read data. In this card game, only a character decided on the attack side can make an attack on a character of the other party (for example, refer to Japanese Unexamined Patent Publication No. 7-121293 (paragraphs [0009] to [0012])).

It can also be seen in a battle in a RPG (role playing game) that the player character and the enemy character fight against each other and an attack is performed by turns on the basis of a turn system. However, at the time of an attack turn of the player character, there are many attack techniques that a player can select. During a period of time until the player selects an attack technique, the progress of a game is usually stopped. Here, in order to avoid that the waiting time becomes too long, and as a result, the progress of the game is stopped for a long period of time, there is a case in which a time limit is set when a player selects an attack technique and an attack technique set beforehand is automatically selected when there is no player's selection even if the time limit elapses. However, player's intention cannot be reflected in the progress of the game. In addition, since those described above are limited to an attack turn corresponding to the automatic selection, there is no subsequent influence on fun of the game.

Furthermore, in a game in which a player is made to compete by indicating a result of the game as a score in order to avoid that the waiting time for selecting an attack technique becomes too long, and as a result, the progress of the game is stopped for a long period of time, there is a case in which a high score is obtained as a time until the attack technique is selected is short. However, since the score does not affect the progress of the game, fun of the game is not increased at all. In addition, in a game in which a result of the game is not indicated by a score (there is a game that is not familiar to a score indication), the method described above is completely meaningless.

Moreover, in a game that adopts an ATB (active time battle), which determines a character to make an attack on the basis of whether or not an attack time set for each character has elapsed not on the basis of a turn, if an attack time of an enemy character elapses while waiting for the selection of an attack technique of a player character, there is a case in which the enemy character makes an attack even while waiting for the selection of the attack technique. In this case, it is preferable to select the attack technique of the player character as quickly as possible in order to increase the number of times in which the player character makes an attack and to decrease the number of times in which the player character is attacked from the enemy character. However, it only appears as a difference of the number of times of an attack whether the selection of the attack technique of the player character is speedy or late. Accordingly, it does not make a big difference on the fun of the game itself whether the selection of the attack technique of the player character is speedy or late. Moreover, in the above case, the selection of the attack technique is not urged in a positive way but the selection of the attack technique is only pressed in a negative way. Accordingly, an effect of an improvement in fun of a game seldom occurs.

Furthermore, since an arcade game machine that is adopted very often as a platform for executing a card game in recent years is supposed to be played by many and unspecified persons, it is not preferable for a specific person to monopolize the game machine to perform a game for a long time. The reason is that there are persons waiting for a turn of the game. Such problem described above was not considered at all in Japanese Unexamined Patent Publication No. 7-121293 since a home video game machine based on an assumption that an owner monopolizes the game machine to perform a game is used as a platform. However, even in the case in which the home video game machine is used as a platform, there may be persons waiting for a turn of a game if friends more than the number of persons that can play with one game machine gather.

SUMMARY OF THE INVENTION

It is an object of the invention to provide a game device and the like which are capable of increasing fun of a game by causing decision at the time of selection to influence the progress of the game, in a game in which a player selects an attack technique of a player character against an enemy character, and which are capable of finishing the game without wasted time when there is a person waiting for a turn of the game.

In order to achieve the object described above, according to a first aspect of the invention, a game apparatus that executes a game in which a player character and an enemy character fight against each other and the characters of the winning party reduces a predetermined parameter set for the character of the opposing party to a predetermined value by means of an attack includes: an attack turn determining unit that determines whether the player character has an attack turn or the enemy character has an attack turn; an enemy attacking unit that causes the enemy character to make an attack on the player character when the attack turn determining unit determines that the enemy character has an attack turn, so that a predetermined parameter of the player character is reduced in accordance with the attack; an attack technique selecting unit that causes a player to select a desired attack technique from a plurality of types of attack techniques provided as attack techniques of the player character when the attack turn determining unit determines that the player character has an attack turn; a player character attacking unit that causes the player character to make an attack on the enemy character by a use of an attack technique selected by the attack technique selecting unit so that a predetermined parameter of the enemy character is reduced due to the attack; and a selection time value accumulator that accumulates a selection time value, which corresponds to shortness of a time until an attack technique is selected by the attack technique selecting unit, each time that the attack technique is selected. The attack technique selecting unit includes a special attack selecting unit that enables a special attack, which causes an amount of reduction in a predetermined parameter of the enemy character to be larger than that in the case of other attack techniques, to be selected as an attack technique of the player character under a condition that the selection time value accumulated by the selection time value accumulator exceeds a predetermined value.

In the game device described above, in a battle between the player character and the enemy character, the player selects an attack technique at the time of an attack turn of the player character and the selection time value is accumulated corresponding to the shortness of a time until the attack technique is selected. Moreover, when the accumulated selection time value exceeds a predetermined value, the special attack can be selected as an attack technique of the player character.

In other words, only a player who selects an attack technique of a player character in each attack turn within a short time can also select a special attack at the time of selection of the attack technique. Thus, on the basis of decision when an attack technique of a player character is selected (whether or not a time until the selection is short) as well as which kind of attack technique of the player character is selected, a change in progress of a game does not occur only with one-time selection but the change in progress of the game occurs at the time of subsequent selection (that is, the game can be more advantageously advanced as the decision becomes excellent). As a result, fun of a game is improved. In addition, since it is possible to urge the player to make a selection in a positive way while reflecting an intention of the player reflect, an effect of an improvement in fun of the game is increased.

In addition, in order to enable a special attack to be selected as an attack technique of a player character, the attack technique should be selected as quickly as possible in an attack turn of the player character until then. Accordingly, it is expected that a period of time for which the selection of a player is simply waited without the progress of a game will be decreased. As a result, it is possible to reduce a case in which a waiting time of another person is increased in a state where the progress of the game is actually stopped, when another person waits for a turn for play of the game. In particular, this effect is noticeable in a case when the game device described above is applied to an arcade game machine.

The game device may further include a member projection control unit that projects a predetermined member, which is disposed in a housing of the game device and is inserted by an operation of a player, when the selection time value accumulated by the selection time value accumulator exceeds a predetermined value. In this case, the special attack selecting unit may select the special attack as an attack technique of the player by inserting a member projected from the housing by the member projection control unit.

Thus, by making the predetermined member projected when the selection time value exceeds a predetermined value, it is possible to make the player easily notice that the special attack can be selected. In addition, by using a method of inserting a projected member as a method of selecting a special attack, it is possible to give to a player a strong impression that the special attack, which causes a predetermined parameter of an enemy character to be reduced more, is a special one different from other attack techniques. The configuration in which such predetermined member is provided in the housing is easily adopted in an arcade game machine. In addition, such configuration enables the progress of a game to be dynamically expressed in a situation where many and unspecified persons can observe the game.

The game device may further includes: a card information reader that reads information written in a desired card selected by the player from cards, which are owned by the player, among a plurality of kinds of cards written with information on one of a plurality of kinds of characters that are used as the player character; and a player character setting unit that sets a character, which corresponds to information read from the card by the card information reader, as a player character to fight against the enemy character in the game.

In this case, the more number of types of cards on hand, the more number of characters that can be selected as player characters to fight against an enemy character. For this reason, not only pleasure of simply playing a game but also pleasure of collecting cards used in the game occurs.

In this case, the special attack selecting unit may include a reading control unit at the time of a special attack that causes the card information reader to read information written in a desired card among the cards, which are owned by the player, when selecting the special attack, and the player attacking unit may reduce a predetermined parameter of the enemy character in accordance with information, which has been read from the card by the card information reader at the time of selection of the special attack, when the special attack is selected as an attack technique of the player.

In this case, even when a player has selected a special attack as an attack technique of a player character, the amount of reduction in predetermined parameter of the enemy character resulting from the special attack varies depending on the type of a card on which information is read at the timing. For this reason, fun when the player selects the special attack as an attack technique of the player character is increased. In addition, pleasure of collecting cards used in a game occurs from a point of view in which a high effect is achieved with the special attack as well as a point of view of simple selection of a player character.

Furthermore, in the case when the plurality of kinds of cards include a special card that allows the player character to make an attack based on an attack technique, which cannot be selected by the attack technique selecting unit, including the special attack by causing the card information reader to read written information when it is determined that the player character has an attack turn, the attack technique selecting unit may select an attack technique corresponding to information written in the special card up to a predetermined number of times of attack turns of the player character until the game is ended from the start. In addition, the player attacking unit may make an attack against the enemy character in accordance with information read from the special card when the information written in the special card has been read by the card information reader, if it is determined that the player character has an attack turn.

In this case, if the player uses a special card when the player has the special card, the player can select an attack technique that cannot be selected if the player does not have the special card. Accordingly, since a person becomes more interested in whether a special card can be obtained or not at the time of collecting cards, the pleasure of collecting cards is further increased. In addition, since the special card can be used only a predetermined number of times among attack turns of a player character (the special card may be used only once), a strategic point of the game related to when to use the special card becomes important, which further increases fun of the game.

In addition, for the plurality of kinds of cards, for example, some of all kinds of cards that can be used in a game may be provided separately from execution of the game. Moreover, in the case when an arcade game machine is applied as the game device described above, a new card may be provided to a player when a coin is inserted to perform a new game (or when the game is ended). In the case in which a new card is provided when the game is ended, different cards may be provided to a player according to a result of the game. In the case when the types of cards obtained as described above are equal, the cards may be exchanged with cards of friends.

The game executed in the game device may have a plurality of stages of a first stage to an n-th stage (where 'n' is an integer equal to or larger than 2) and the player character may fight against different enemy characters for each of the stages. In this case, the selection time value accumulator may accumulate the selection time value from the first stage even if a stage proceeds to a second stage or a stage subsequent to the second stage. In addition, a predetermined parameter of an enemy character that fights against the player character at the n-th stage may be reduced up to the predetermined value only when the special attack is selected as an attack technique of the player character by the special attack selecting unit.

In this case, it is preferable that the selection time value accumulator do not accumulate the selection time value up to a predetermined value, which allows the special attack to be selected, until the (n−1)-th stage, regardless of a time until an attack technique is selected in each attack turn of the player character by the attack technique selecting unit.

In this case, in order to clear the n-th stage (to reduce a predetermined parameter of an enemy character up to a predetermined value without reducing a predetermined parameter of a player character up to a predetermined value), it is necessary not only to quickly select an attack technique at the n-th stage but also to quickly select an attack technique even at the (n−1)-th stage before the n-th stage. For this reason, even in a game divided into a plurality of stages of the first to n-th stages, the game does not progress independently for every stage but a stage progressing game, in which the first to (n−1)-th stages progress toward the n-th stage, is realized. As a result, a high-level game in which all stages are connected with each other can be realized. In addition, since the selection time value is not accumulated up to a predetermined value until the (n−1)-th stage, that is, the special attack can be selected only at the n-th stage, it is possible to make the n-th stage of the game meaningful, which further improves the fun of a game.

Furthermore, in this case, it is preferable that the game device further include a charging unit that charges a predetermined fee at the start of a new game. In addition, it is preferable that the game be continuously performed until a predetermined parameter of the player character is reduced to the predetermined value or a predetermined parameter of the enemy character is reduced to the predetermined value at the n-th stage by means of one-time charging of the charging unit.

A method of performing charging whenever a new game is started is typically adopted in an arcade game machine. Since it may be possible to finish the first to n-th stages with one-time charging according to decision when selecting an attack technique of the player character through all stages of the first to n-th stages, it is possible to further urge the player to quickly select an attack technique in an attack turn of the player character.

In the game device described above, a plurality of player characters fighting against the enemy character may exist in the game. In this case, the attack technique selecting unit may cause the player to sequentially select an attack technique of each of the plurality of player characters when the attack turn determining unit determines that the player character has an attack turn, and the selection time accumulator may accumulate the selection time value in common with the plurality of player characters.

Thus, the plurality of player characters fighting against the enemy character exist and the selection time value corresponding to the shortness of a time until an attack technique is selected is accumulated in common with all of the player characters even if the attack technique is independently selected for each of the player characters. Accordingly, since it is possible to urge the player to quickly select not only an attack technique of a specific player character but also attack techniques of any types of player characters, it can be prevented that a waiting time for which selection of the player is simply waited without the progress of the game increases.

In this case, the game device may further include a player character selecting unit that selects a plurality of player characters to fight against the enemy character from characters, the number of which is larger than the number of characters capable of fighting against the enemy character in the game, according to an instruction from the player at the start of the game.

Thus, by causing a player to be able to select a plurality of player characters fighting against an enemy character when a game starts, it is possible to give pleasure to the player not only while the game is being advanced but also before the game starts to progress.

In the case when the game device includes the player character selecting unit, the game device may further include a parameter initial value changing unit that when a combination of a plurality of player characters selected by the player character selecting unit is a predetermined combination, changes an initial value of a predetermined parameter of at least one of the plurality of player characters selected at the start of the game.

Here, in the case when a predetermined attribute and an initial value of the predetermined parameter are set for each of the plurality of player characters, the parameter initial value changing unit may change an initial value of a predetermined parameter of at least one of the plurality of selected player characters at the start of the game when a combination of attributes of a plurality of player characters selected by the player character selecting unit is a predetermined combination.

Thus, since an initial value of a predetermined parameter of at least one player character is changed by the combination of the plurality of player characters (or combination of attributes) selected by the player, fun when selecting a player character is increased. Here, in the case when any of the plurality of player characters is set by reading information written in a card selected from cards that the player possesses, not only the number of cards to collect but also a combination of types of cards to collect becomes important, which also increases the pleasure of collecting cards.

Furthermore, in the case when the game device includes the player character selecting unit, the game device may further include a special character setting unit that causes a special character to fight against the enemy character instead of the plurality of selected player characters according to an instruction from the player when a combination of the plurality of player characters selected by the player character selecting unit is a special combination.

Here, in the case when a predetermined attribute is set for each of the plurality of player characters, the special character setting unit may cause the special character to fight against the enemy character according to an instruction from the player when a combination of attributes of the plurality of player characters selected by the player character selecting unit is a special combination.

Thus, since it is also possible to cause a special character to fight against an enemy character by the combination of the plurality of player characters (or combination of attributes) selected by the player, fun when selecting a player character is increased. Here, in the case when any of the plurality of player characters is set by reading information written in a card selected from cards that the player possesses, not only the number of cards to collect but also a combination of types of cards to collect becomes important, which also increases the pleasure of collecting cards.

In the game device described above, in the case when the plurality of player characters fighting against the enemy characters exist. The game device according to any one of claims 9 to 14, wherein the attack technique selecting unit may select a combination of attack techniques set for the plurality of player characters by inputting an instruction in predetermined procedures without sequentially selecting the attack techniques of the plurality of player characters when the attack turn determining unit determines that the player character has an attack turn. In addition, the player attacking unit may make an attack on the enemy character on the basis of a combination of attack techniques set for the plurality of player characters and reduces a predetermined parameter of the enemy character by using a different standard from that in a case, in which attack techniques with respect to the respective player characters are sequentially selected, when the attack is made on the enemy character using the combination.

In this case, it becomes possible not only that the plurality of player characters makes a separate attack on the enemy character, but that the plurality of player characters makes an attack on the enemy character with the combination of attack techniques of the plurality of player characters. As a result, fun caused by appearance of the plurality of player characters is increased. In addition, since the player needs to input an instruction in predetermined procedures in order to select an attack based on the combination of attack techniques of the plurality of player characters, the player may be interested in memorizing the predetermined procedures. In addition, the predetermined procedures by which an instruction when selecting the combination of attack techniques is input may be changed according to the combination of the plurality of player characters fighting against the enemy character.

The game device may be communicably connected with another game device capable of executing the same game. In this case, the enemy character may be a player character, which is operated by another player, in another game device connected to the game device.

In addition, if the game device is an arcade game machine, another game device may be an arcade game machine that is installed adjacent to the arcade game machine in a game center and the like or an arcade game machine that is installed in a remote game center and is connected to the arcade game machine through a communication line, for example. In addition, another game device may be a portable game machine connected through an infrared communication and the like if the game device is a portable game machine. If the game device is a non-portable home video game machine, another game device may be another non-portable game device connected through a communication line.

In this case, since a battle play between friends or unknown persons becomes possible, pleasure of the game is further increased.

In order to achieve the object described above, according to a second aspect of the invention, a method of advancing a game which is executed in a computer device including an input device for inputting a player's instruction, a storage device for storing information required to advance the game, a processing device for performing processing for advancing the game, and a display device for displaying an image of the game and in which a player character moving according to a player's instruction and an enemy character fight against each other includes: granting an attack right to the player character or the enemy character by processing of the processing device in accordance with a game progress situation such that one of the characters granted with the attack right has an attack turn; displaying an image, which indicates that the enemy character makes an attack on the player character by processing of the processing device, and reducing a predetermined parameter of the player character stored as information in the storage device in response to the attack when the enemy character has an attack turn; causing a player to input a desired attack technique from a plurality of kinds of attack techniques, which are set as attack techniques of the player character by processing of the processing device, through the input device when the player character has an attack turn; displaying an image, which indicates that the player character makes an attack on the enemy character by using an attack technique that is input from the input device by processing of the processing device, and reducing a predetermined parameter of the enemy character stored as information in the storage device in response to the attack; calculating a selection time value corresponding to shortness of a time until an attack technique is input from the input device by processing of the processing device and updating an accumulation selection time value that is accumulated each time when the attack technique is input and is stored as information in the storage device; enabling a special attack, which causes an amount of reduction in a predetermined parameter of the enemy character to be larger than that in the case of other attack techniques by means of processing of the processing device, to be selected as an attack technique of the player character when the player character has an attack turn, in the case when the accumulation selection time value exceeds a predetermined value; displaying indication of winning of the enemy character on the display device when a predetermined parameter set for the player character has been reduced up to a predetermined value with an attack of the enemy character against the player character by means of processing of the processing device; and displaying indication of winning of the player character on the display device when a predetermined parameter set for the enemy character has been reduced up to a predetermined value with an attack of the player character against the enemy character by means of processing of the processing device.

In order to achieve the object described above, according to a third aspect of the invention, a program that causes a computer device to execute a game in which a player character moving according to a player's instruction and an enemy character fight against each other and one of the characters that reduces a predetermined parameter set for the other party's character up to a predetermined value by means of an attack wins causes the computer device to function as: an attack turn determining unit that determines whether the player character has an attack turn or the enemy character has an attack turn; an enemy attacking unit that causes the enemy character to make an attack on the player character when the attack turn determining unit determines that the enemy character has an attack turn, such that a predetermined parameter of the player character is reduced in accordance with the attack; an attack technique selecting unit that causes a player to select a desired attack technique from a plurality of kinds of attack techniques set as attack techniques of the player character when the attack turn determining unit determines that the player character has an attack turn; a player attacking unit that causes the player character to make an attack on the enemy character by the use of an attack technique selected by the attack technique selecting unit such that a predetermined parameter of the enemy character is reduced due to the attack; and a selection time value accumulator that accumulates a selection time value, which corresponds to shortness of a time until an attack technique is selected by the attack technique selecting unit, each time when the attack technique is selected. The attack technique selecting unit includes a special attack selecting unit that enables a special attack, which causes an amount of reduction in a predetermined parameter of the enemy character to be larger than that in the case of other attack techniques, to be selected as an attack technique of the player character under a condition that the selection time value accumulated by the selection time value accumulator exceeds a predetermined value.

The program according to the third aspect of the invention may be provided in a state in which the program is recorded in a computer-readable recording medium. The computer-readable recording medium may be a recording medium that is configured to be detachable from the computer device and is provided separately from the computer device. The computer-readable recording medium may be a recording medium, such as a fixed disk device, which is provided within the computer device and is provided together with the computer device. The program according to the third aspect of the invention may be distributed from a server device existing on a network to the computer device through a network by superimposing a data signal of the program on a carrier.

BRIEF DESCRIPTION OF THE DRAWINGS

FIG. 3 is a view illustrating an example of a trading card used in the arcade game machine according to the embodiment of the invention;

FIG. 5A is a view explaining various kinds of data that are managed in a RAM in order to perform a game in the arcade game machine according to the embodiment of the invention;

FIG. 5B is a view explaining various kinds of data that are managed in a RAM in order to perform a game in the arcade game machine according to the embodiment of the invention;

FIG. 5C is a view explaining various kinds of data that are managed in a RAM in order to perform a game in the arcade game machine according to the embodiment of the invention;

DESCRIPTION OF THE PREFERRED EMBODIMENTS

Hereinafter, an embodiment of the invention will be described with reference to the accompanying drawings.

Figure 1:
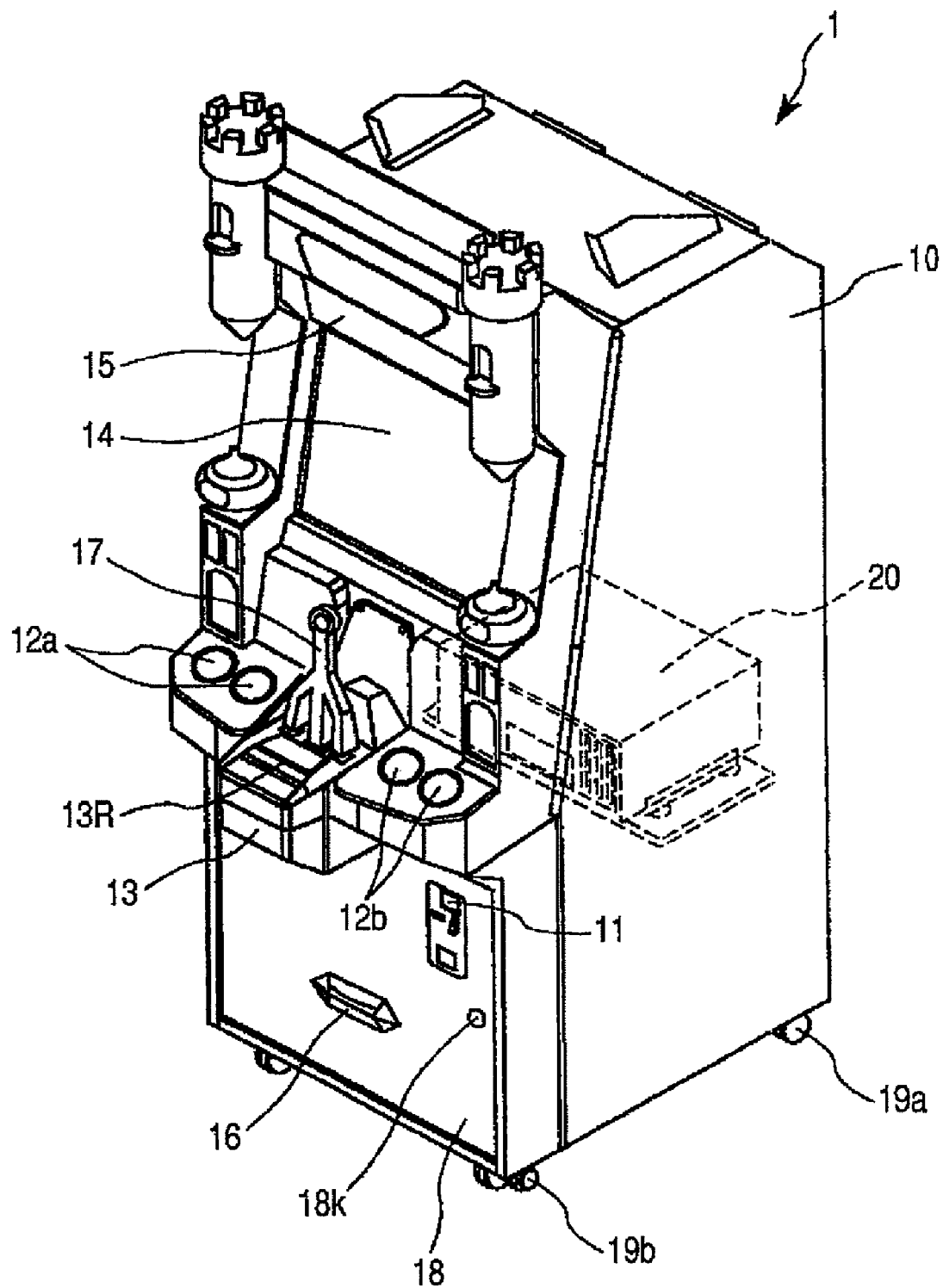
FIG. 1 is a view illustrating the outer configuration of an arcade game machine according to the embodiment of the invention.

FIG. 1 is a view illustrating the outer configuration of an arcade game machine according to the embodiment. In an arcade game machine 1, a speaker 15 that is disposed in an upper part of a front surface of a housing 10 so as to output a sound and a display device 14 that is formed by using a CRT or a liquid crystal device so as to display an image are provided as shown in the drawing. A front door 18 that can be opened by an operation of a door key 18K is provided in a lower part of the front surface of the housing 10. The front door 18 is provided with a coin slot 11 into which a coin is inserted to start a game and a card discharge port 16 used to discharge a trading card, which will be described later, to the outside. A coin corresponding to a predetermined amount of money or a medal for a game that can be purchased with a predetermined amount of money may be applied as a coin that is inserted into the coin slot 11 in order to start a game.

A first player operation button 12a and a second player operation button 12b are provided left and right on a table-like surface positioned between the upper display device 14 and the lower front door 18. In the arcade game machine 1, the first player button 12a is a button that is operated to advance a game by a player, who performs the game alone (including a case in which a battle against another arcade game machine having the same configuration is performed through a network), or one player in a case in which two persons perform a game. The second player operation button 12b is a button that is operated to advance a game by the other player in a case in which the game is performed by two persons only with the arcade game machine 1.

A scanner 13 that reads code data (which will be described later) written in a trading card, which is inserted through a card slot 13R, is provided at a front side of the middle of the table-like surface. At a rear side of the middle of the table-like surface, a sword 17 that is movable in an up and down direction is provided. The sword 17 is driven to rise up by a sword driving unit 17D when a predetermined condition, which will be described later, is satisfied. The sword 17 can be returned to an original state when a player pushes the sword 17 downward while the sword 17 is in the above state.

In addition, a caster 19a is provided at a rear side of a lower surface of the housing 10 such that the arcade game machine 1 can be easily moved. An adjuster 19b that adjusts the height is provided at a front side of the lower surface of the housing 10 such that the arcade game machine 1 can be stably disposed regardless of unevenness of an installation place. In addition, a shielding case 20 in which, for example, a substrate having a control circuit mounted thereon is stored is provided inside the housing 10.

Figure 2:
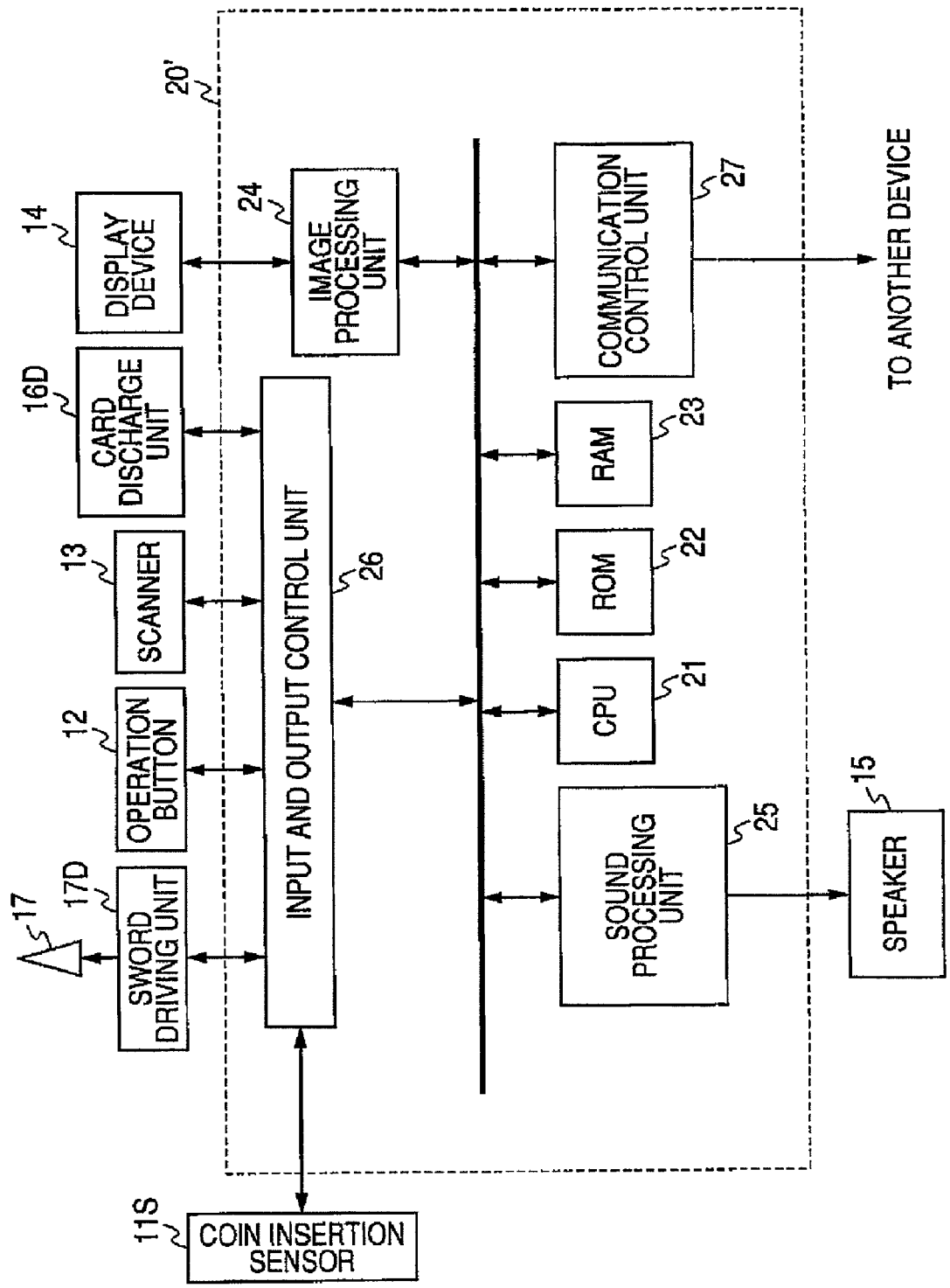
FIG. 2 is a block diagram illustrating the circuit configuration of the arcade game machine according to the embodiment of the invention.

FIG. 2 is a block diagram illustrating the circuit configuration of the arcade game machine 1 shown in FIG. 1. As shown in the drawing, in the arcade game machine 1, a control circuit (computer device) 20' is stored within the shielding case 20. The control circuit 20' includes a CPU (central processing unit) 21, a ROM (read only memory) 22, a RAM (random access memory) 23, an image processing unit 24, a sound processing unit 25, an input and output control unit 26, and a communication control unit 27.

The CPU 21 controls each unit of the arcade game machine 1 by executing a program stored in the ROM 22, thereby advancing a game provided in the arcade game machine 1. The CPU 21 includes an internal timer. The ROM 22 stores a program executed by the CPU 21 and various kinds of data that is not changed according to the progress of a game. The RAM 23 is used as a work area of the CPU 21 and stores data that is changed according to the progress of a game.

The image processing unit 24 is connected to the display device 14, generates an image corresponding to a game progress situation in accordance with an instruction from the CPU 21, and displays the generated image on the display device 14. The sound processing unit 25 is connected to the speaker 15 and outputs a sound effect corresponding to the game progress situation in accordance with an instruction from the CPU 21.

The input and output control unit 26 is connected to a coin insertion sensor 11S that detects the insertion of a coin through the coin slot 11, the operation button 12 (12a and 12b), the scanner 13, a card discharge unit 16D that discharges a card stacked on a card stacker (not shown) from the card discharge port 16 to the outside, and the sword driving unit 17D including a driving circuit that drives the sword 17 and a sensor that detects driving of the sword 17. A detection signal of the coin insertion sensor 11S, an input signal of the operation button 12, data read from a trading card by the scanner 13, and a detection signal when the sword 17 is pushed by a player are input to the CPU 21 through the input and output control unit 26. In addition, an instruction to raise the sword 17 is transmitted from the CPU 21 to the sword driving unit 17D through the input and output control unit 26.

The communication control unit 27 is connected to another device in order to control transmission/reception of information to/from another connected device. Another device connected to the communication control unit 27 may be another arcade game machine having the same configuration as the arcade game machine 1. Another connected arcade game machine may be an arcade game machine that is disposed adjacent to the arcade game machine 1 and is connected to the arcade game machine 1 through an exclusive line or may be an arcade game machine that is disposed in a remote game center and is connected to the arcade game machine 1 through a communication line, such as a telephone line or Internet. In addition, another device connected to the communication control unit 27 may be a management computer in a game center where the arcade game machine 1 is disposed.

In the arcade game machine 1 according to the embodiment, in order to select a player character that will participate in a game and fight against an enemy character, a trading card written with information on a character that can be selected as a player character is used. As for a trading card, some of the plurality of kinds of trading cards is provided as a master card separately from the execution of a game. In addition, when a coin is inserted to start a new game, one new card is provided. If a person has the same cards, the person may exchange the same card with a new card that his or her friend has. In such a method, a player needs to obtain and possess at least three cards (since the player is supposed to operate three player characters) before starting the game. However, even if the player has only one or two cards, the player may generate an insufficient player character at random and start a game.

FIG. 3 is a view illustrating an example of a trading card used in the arcade game machine 1 according to the embodiment. A character 31, a character name 32, character information 33, and code data 34 are drawn on a surface of a trading card 30. One of the characters that can participate as a player character in a game is drawn as the character 31, and a character drawn on the trading card 30 that makes the scanner 13 read the code data 34 appears as one of the player characters in the game.

The character name 32 is a name of a character drawn on the trading card 30. The character information 33 is basic information on the character drawn on the trading card 30. For example, the character information 33 includes an initial value of HP (hit point: physical strength value of a character), fundamental capability values such as attack power and defense power, and an attribute of the player character 31 at the start of the game. The code data 34 is obtained by coding data for uniquely identifying the trading card 30.

Next, a method of operating a player at the time of performing a game in the arcade game machine 1 according to the embodiment will be described. Here, it is assumed that the player already has several trading cards and plays the game alone while fighting against a computer. FIGS. 4A to 4I are views explaining a game advancing method and a game operating method in the arcade game machine 1.

Figure 4A:
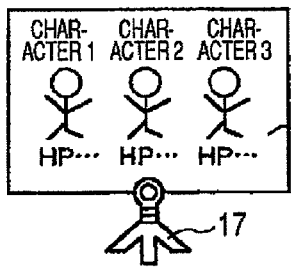
FIG. 4A is a view explaining a game advancing method and a game operating method in the arcade game machine according to the embodiment of the invention.

When a coin for one game is inserted, one-person play can be selected. When the one-person play is instructed by an operation of the operation button 12, the new trading card 30 is discharged from the card discharge port 16. In addition, three enemy characters to fight against the player are determined by computer processing in the arcade game machine 1. As a result, as shown in FIG. 4A, a screen 14A on which the determined enemy characters are shown is displayed on the display device 14.

Figure 4F:
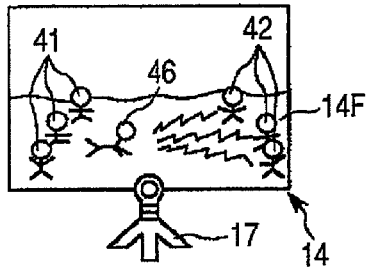
FIG. 4F is a view explaining the game advancing method and the game operating method in the arcade game machine according to the embodiment of the invention.
Figure 4B:
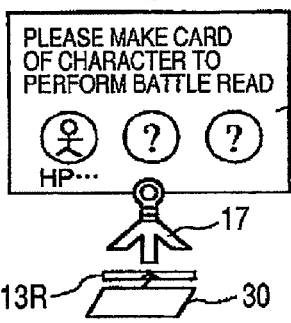
FIG. 4B is a view explaining the game advancing method and the game operating method in the arcade game machine according to the embodiment of the invention.

Then, the player is made to select a player character that performs a battle against the enemy characters. Here, as shown in FIG. 4B, a screen 14B that instructs the player to insert the trading card 30 into the card slot 13R so that the scanner 13 read the code data 34 is displayed on the display device 14. Here, the player makes the scanner 13 read the three trading cards 30 in a sequential manner, such that a player character participating in the battle is decided one by one whenever one trading card 30 is read. In addition, it is not valid that the player makes the scanner 13 read the same trading card 30 as that already read.

Figure 4G:
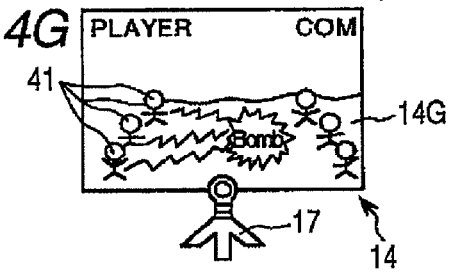
FIG. 4G is a view explaining the game advancing method and the game operating method in the arcade game machine according to the embodiment of the invention.
Figure 4C:
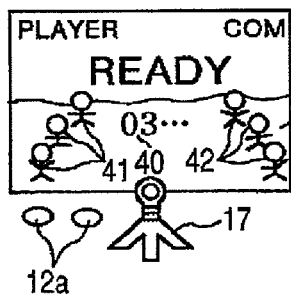
FIG. 4C is a view explaining the game advancing method and the game operating method in the arcade game machine according to the embodiment of the invention.

Next, as shown in FIG. 4C, a standby screen 14C for the start of a battle is displayed. On the standby screen 14C for the start of a battle, three player characters 41 and three enemy characters 42 are disposed and a remaining time 40 before the start is displayed. When the remaining time 40 before the start becomes '0', the battle starts and a battle screen is displayed on the display device 14. While waiting for an attack turn of a player (player character 41) or computer processing (enemy character 42), almost the same screen (not including the display of the remaining time 40 and the display of a message indicating a standby state) as the standby screen 14C is displayed as the battle screen on the display device 14.

Figure 4H:
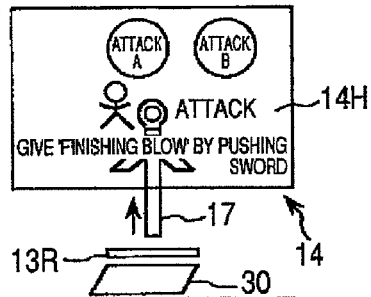
FIG. 4H is a view explaining the game advancing method and the game operating method in the arcade game machine according to the embodiment of the invention.
Figure 4D:
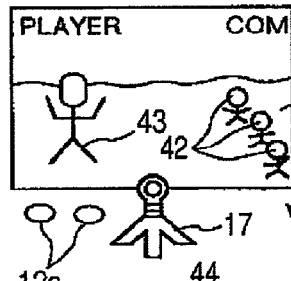
FIG. 4D is a view explaining the game advancing method and the game operating method in the arcade game machine according to the embodiment of the invention.

In the case in which attributes of the three player characters 41 in this battle are equal, if the first player operation button 12a is operated in predetermined procedures until the remaining time 40 before the start becomes '0', a battle screen 14D on which a special character 43 performs a battle as a player character instead of the three player characters 41 is displayed on the display device 14, as shown in FIG. 4D. The special character 43 has the HP and other capabilities twice higher than those of each character appearing as the player character 41.

When the remaining time 40 before the start is set to '0', the battle starts and an attack turn of the player or the computer processing alternates. In the case of an attack turn of the player, as shown in FIG. 4E, a selection screen 14E for selecting an attack technique for every character is displayed on the display device 14. On the attack technique selection screen 14E, an attack technique display portion 44 and a courage gauge 45 corresponding to left and right buttons of the first player operation button 12a are included. Even though each character prepares two attack techniques, left and right positions of the attack techniques are decided at random each time the attack technique selection screen 14E is displayed. In addition, the courage gauge 45 decreases with time until one of the attack techniques is selected by the first player operation button 12a.

In the case when the three player characters 41 perform the battle without the special character 43, it is necessary to select an attack technique for each of the player characters 41 in one attack turn of the player, and a point corresponding to the length of the courage gauge 45 at the time of selecting each attack technique is added to a courage point. In the case when the special character 43 performs the battle, an attack technique is selected only once in one attack turn of the player, and a point corresponding to three times the length of the courage gauge 45 at the time of selecting the attack technique is added to a courage point.

When the attack technique selection screen 14E is displayed, the player may insert the trading card 30 into the card slot 13R so that the scanner 13 reads the code data 34. In the case when special information indicating that the read trading card 30 is a special card is described as shown in FIG. 4F, a call character 46 other than the player characters 41 (or the special character 43) is called and a call attack screen 14F on which the call character 46 makes an attack on the enemy character 42 is displayed on the display device 14. A special card can be used only once in a series of games which can be played by one coin insertion. In addition, while the attack technique selection screen 14E is being displayed, the trading card 30 excluding the special card is disregarded even if the trading card 30 is read.

While the attack technique selection screen 14E is being displayed, if the player operates the first player operation button 12a in predetermined procedures, for example, hits the first player operation button 12a repeatedly and a combination of attack techniques respectively selected for the three player characters 41 is a predetermined combination, a combination attack screen 14G on which the three player characters 41 attack the enemy character 42 at the same time by combining respective attacks is displayed on the display device 14, as shown in FIG. 4G.

In addition, when a courage point reaches a predetermined point at the time of an attack turn of the player, the sword 17 is raised upward, as shown in FIG. 4H. At the same time, an attack technique selection screen 14H on which hitting a 'finishing blow' on the enemy character 42 can be selected as an attach technique is displayed on the display device 14. Here, the player may insert the trading card 30 into the card slot 13R so that the scanner 13 reads the code data 34. Moreover, in the case when the code data 34 is read from the plurality of trading cards 30, only the trading card 30 read at the last is effective. In addition, when a special card is first read, call of the call character 46 is prioritized.

Figure 4I:
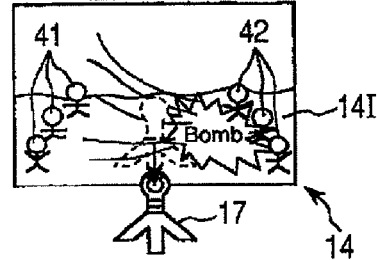
FIG. 4I is a view explaining the game advancing method and the game operating method in the arcade game machine according to the embodiment of the invention.
Figure 4E:
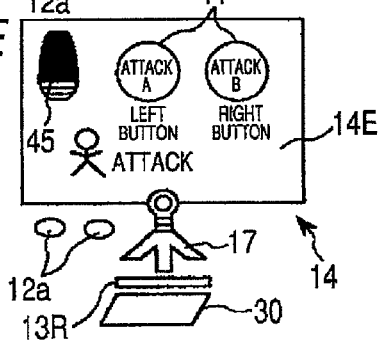
FIG. 4E is a view explaining the game advancing method and the game operating method in the arcade game machine according to the embodiment of the invention.

If the player pushes the raised sword 17 after the scanner 13 has read the trading card 30 (this is not an essential operation), a blow attack screen 14I allowing to hit the 'finishing blow' on the enemy character 42 is displayed on the display device 14, as shown in FIG. 4I. In addition, a courage point does not reach a predetermined point in a stage before a final stage regardless of a period until an attack technique is selected on the attack technique selection screen 14E, and the 'finishing blow' can be executed only in the final stage. In addition, the HP of the enemy character 42 appearing in the final stage does not be '0' unless the 'finishing blow' is hit on the enemy character 42.

In addition, an attack turn of the player and an attack turn of computer processing alternately occur, and the HP of the player character 41 (or the special character 43) that has received an attack from the enemy character 42 in the attack turn of the computer processing is decreased corresponding to the attack. The player character 41 whose HP has reached '0' cannot participate in a subsequent battle (however, the player character 41 may be revived when shifting to the next stage). If the HPs of all of the three player characters 41 reach '0' (or the HP of the special character 43 reaches '0'), the player loses and the game ends.

The HP of the enemy character 42, which has received an attack from the player character 41 (or the special character 43 or the call character 46) according to an instruction of the player in the attack turn of the player is decreased in accordance with the attack. The enemy character 42 whose HP has reached '0' cannot participate in a subsequent battle and the corresponding stage is cleared when all HPs of the three enemy characters 42 become '0'. When a final stage is cleared, the player wins the game and the game ends. If a stage before the final stage is cleared, the screen shifts to the next stage. Then, the enemy character 42 in a new stage appears, and thus the game resumes.

Next, data that is managed to perform a game in the arcade game machine 1 according to the embodiment will be described. Here, data managed in the RAM 23 will be described by using, as an example, a case in which a player alone plays while fighting against a computer. In addition, data that changes with the progress of a game is stored beforehand in the ROM 22, and initial values of information (for example, HP, capability value, attribute, and attack technique) on characters written in various kinds of trading cards 30 distributed to many and unspecified players are also included in the ROM 22. In addition, initial values of information (for example, HP, capability value, attribute, and attack technique) on characters that can appear as enemy characters are also included in the ROM 22.

FIG. 5A is a view illustrating a player character table stored in the RAM 23. A player character name 51, an HP 52, a capability value 53, an attribute 54, an attack technique A 55, and an attack technique B 56 regarding a character corresponding to code data of the trading card 30 read by the scanner 13 are registered in a player character table 50 so as to correspond to the character. In the case when the special character 43 participates in a battle instead of the player character 41, a character registered in the player character table 50 is only the special character 43.

The player character name 51 is a name of a character (or the special character 43 that replaces the character) that is selected as the player character 41 by the player after the code data 34 has been read from the trading card 30 possessed by the player by the scanner 13. The HP 52 is a current HP value of the corresponding player character 41 (or the special character 43). The player character 41 whose HP 52 becomes '0' cannot fight in the battle. In addition, when the HPs 52 of all player characters 41 become '0', the player loses in the battle. The capability value 53 is a capability value, such as an attack power or a defense power of the corresponding player character 41. The HP 52 and the capability value 53 change with the progress of a game.

The attribute 54 is an attribute of the corresponding player character 41. When a character having the same attribute is selected as the player character 41 and is registered in the player character table 50, it becomes possible to make the special character 43 appear. The attack technique A 55 and the attack technique B 56 are first and second attack techniques, respectively, when the corresponding player characters 41 attack the enemy character 42. The player selects any of the attack technique A 55 and the attack technique B 56 in the attack turn of the player.

FIG. 5B is a view illustrating an enemy character table stored in the RAM 23. An enemy character name 61, an HP 62, a capability value 63, an attribute 64, and an attack technique 65 regarding each of the enemy character 42 selected as characters, which are supposed to participate in a battle in a current stage, are registered in an enemy character table 60 so as to correspond to each enemy character. The enemy character name 61 is a name of each of the enemy characters 42 appearing in the corresponding stage. The HP 62 and the capability value 63 are similar to those of the player character 41, and the HP 62 and the capability value 63 also change with the progress of a game.

The attribute 64 is an attribute of the corresponding enemy character 42. As types of the attribute 64, there are the same kinds of attributes 54 as the player character 41. There are cases of the same attributes, opposite attributes, and other attributes. Assuming that the player character 41 and the enemy character 42 have the same capability values 53 and 63, damage is relatively large when the player character 41 and the enemy character 42 are attacked by the enemy character 42 and the player character 41 having opposite attributes and the damage is relatively small when the player character 41 and the enemy character 42 are attacked by the enemy character 42 and the player character 41 having the same attributes. Only one kind of attack technique 65 of the enemy character 42 is registered unlike the player character 41.

FIG. 5C is a view illustrating various kinds of data, which is required for the progress of a game and is managed in the RAM 23 consistently from the start to the end of the game, other than the player character table 50 and the enemy character table 60. Such data includes a stage No. 71, a courage point 72, an attack turn 73, and a call flag 74.

The stage No. 71 indicates a number of a stage in a current game. For example, when there are three stages of first to third stages, any one of the numbers '1', '2', and '3' is input. The courage point 72 is obtained by accumulating a value corresponding to the length of the courage gauge 45 when an attack technique of the player character 41 (or the special character 43) is selected. When the courage point 72 reaches a predetermined value, the 'finishing blow' may be executed.

The attack turn 73 indicates which one of a player and computer processing has an attack turn in the case of a one-person play and which one of two players has an attack turn in the case of a two-person play. The call flag 74 is a flag that is set when an attack of the call character 46 is performed by using a special card during a game that can be performed by one-time coin insertion. In the case when the call flag 74 is set, even if a special card is read in the attack turn of the player, it is not possible to call another call character 46 to attack the enemy character 42.

In addition, data required for the progress of a game may be temporarily stored in the RAM 23, even though the data is not data that is consistently managed from the start to the end of the game. Such data includes an attack technique selected for each of the player characters 41, damage that is caused to the player character 41 or the enemy character 42 due to an attack, the code data 34 of the trading card 30 read by the scanner 13, and the like.

Hereinafter, processing in the arcade game machine 1 according to the embodiment will be described. In a state in which a game is not performed, a demo screen or a coin insertion instruction screen is displayed. When the coin insertion sensor 11S detects that a coin has been inserted three the coin slot 11, it becomes possible to perform a one-person play. If it is instructed to perform the one-person play by means of an operation of the first player operation button 12a, a game for the one-person play is started.

Figure 6B:
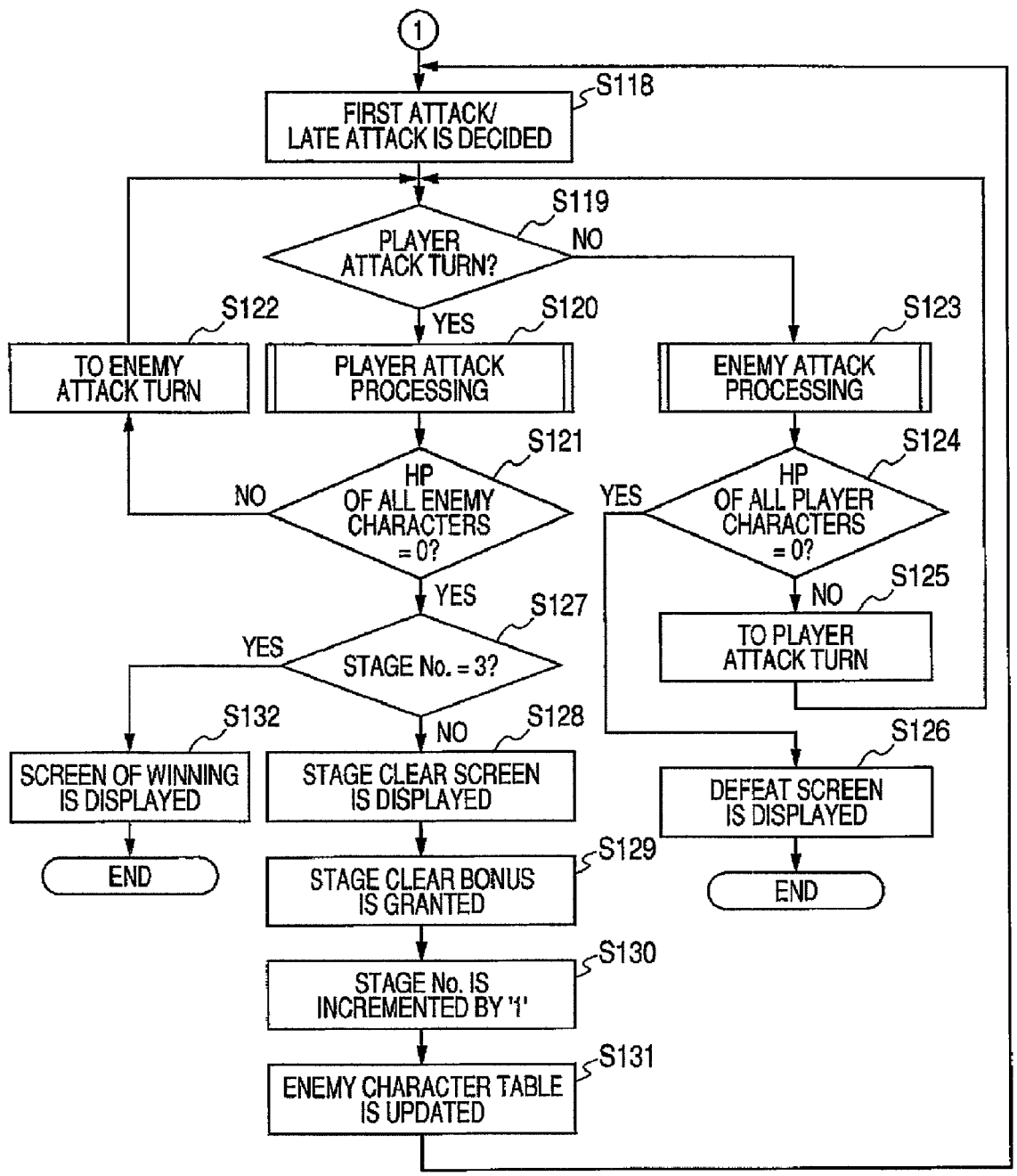
FIG. 6 is a flow chart illustrating processing executed when a one-person play is selected in the arcade game machine according to the embodiment of the invention.

FIG. 6 is a flow chart illustrating processing executed when a one-person play is selected. In this flow chart, it is assumed that stages of a game are from a first stage to a third stage. First, the CPU 21 controls the card discharge unit 16D such that one of the trading cards 30 stacked on a card stacker is discharged (step S101).

Then, the CPU 21 determines the type of an enemy character that will perform a battle against a player character in this game. Here, three enemy characters are determined for each of the first to third stages. The CPU 21 reads initial information on the enemy characters, which are determined to perform the battle, from the ROM 22 and registers information on the enemy characters 42 appearing in the first stage in the enemy character table 60 of the RAM 23. As for the enemy characters 42 appearing in the second stage or the third stage, only information indicating the selection of a character is temporarily stored in the RAM 23 (step S102). If the enemy characters are determined, the CPU 21 transmits an instruction to the image processing unit 24 so that the introduction screen 14A of the determined enemy characters is displayed on the display device 14 (step S103).

Then, the CPU 21 transmits an instruction to the image processing unit 24 so that the screen 14B, which instructs the player to cause the trading card 30 on hand to be read by the scanner 13, is displayed on the display device 14 (step S104). The CPU 21 causes the scanner 13 to read the code data 34 written in the trading card 30 that the player has inserted through the card slot 13R according to the screen 14B (step S105) The CPU 21 determines whether or not the code data 34 read by the scanner 13 is equal to code data that has been already read (step S106) If it is determined that the code data 34 read by the scanner 13 is equal to code data that has been already read, the CPU 21 disregard the read code data 34 and returns to processing in step S104.

If it is determined that the code data 34 read by the scanner 13 is code data that is not read yet, the CPU 21 reads initial information on a character corresponding to the read code data 34 from the ROM 22 and registers the read initial information in the player character table 50 of the RAM 23 as one of the player characters 41 that participate in a battle (step S107). The CPU 21 determines whether or not information on the three player characters 41 has been registered in the player character table 50 (step S108). If it is determined that the information on the three player characters 41 is not registered yet, the process returns to processing in step S104.

If the information on the three player characters 41 is registered, the CPU 21 sets '1' as an initial value in the stage No. 71 (step S109). The CPU 21 determines whether or not the three player characters 41 on which information is registered in the player character table 50 are the combination of specific characters defined beforehand (step S110). If it is determined that the three player characters 41 are the combination of specific characters, the CPU 21 causes the HP 52 of each player character 41 registered in the player character table 50 to be increased by 10% (step S111), proceeding to processing in step S112. If it is determined that the three player characters 41 are not the combination of specific characters, the process proceeds to step S112.

In step S112, the CPU 21 starts to check a waiting time before the start of a battle by using an internal timer. Here, the CPU 21 transmits an instruction to the image processing unit 24 so that the standby screen 14C for the start of a battle is displayed on the display device 14 (step S113). Then, the CPU 21 determines whether or not the waiting time before the start of the battle has elapsed (step S114). If it is determined that the waiting time before the start of the battle has not elapsed, the CPU 21 determines whether or not the attributes 54 of the three player characters 41 registered in the player character table 50 are equal to each other (step S115). If it is determined that the attributes 54 are equal to each other, the CPU 21 determines whether or not the first player operation button 12a has been operated in predetermined procedures (step S116).

If it is determined that the attributes 54 of the three player characters 41 are not equal or it is determined that the first player operation button 12a is not operated in the predetermined procedures, the process returns to processing in step S113. If it is determined that the first player operation button 12a is operated in the predetermined procedures in step S116, the CPU 21 changes a character, which performs the battle, to the special character 43 according to the combination of the three player characters 41 and registers the changed special character 43 in the player character table 50' (step S117). Then, the process proceeds to processing in step S118. Even in the case when it is determined that the waiting time has elapsed in step S114, the process proceeds to processing in step S118.

In step S118, the CPU 21 determines which one of the player (player character 41 or special character 43) and the computer processing (enemy character 42) will have a priority of an attack by execution of a random function, for example. The CPU 21 sets the attack turn 73 for a party that has been determined to have the priority of an attack. Then, the CPU 21 determines whether or not this attack turn is for the player with reference to the attack turn 73 (step S119).

If it is determined to be the attack turn of the player, the CPU 21 causes the player to select an attack technique of each of the player characters 41 (or the special character 43) by performing player attack processing, which will be described in detail later. By using the selected attack technique, the player character 41 (or the special character 43) makes an attack on the enemy character 42 (step S120). As a result of the player attack processing, the CPU 21 determines whether or not the HPs 62 of all enemy characters 42 in the current stage have become '0' (step S121). If all HPs 62 of all enemy characters 42 have not become '0', the CPU 21 sets the attack turn 73 as an attack turn of the computer processing (step S122). Then, the process returns to processing in step S119.

On the other hand, if it is determined to be the attack turn of the enemy character in step S119, the CPU 21 causes the enemy character 42 to attack the player character 41 (or the special character 43) by performing enemy attack processing, which will be described in detail later (step S123) As a result of the enemy attack processing, the CPU 21 determines whether or not the HPs 52 of all player characters 41 (or the special character 43) have become '0' (step S124). If all HPs 52 of all player characters 41 (or the special character 43) have not become '0', the CPU 21 sets the attack turn 73 as an attack turn of the player (step S125). Then, the process returns to processing in step S119.

If all HPs 52 of all player characters 41 (or the special character 43) have become '0', the CPU 21 transmits an instruction to the image processing unit 24 so that a screen showing that the player has lost is displayed on the display device 14 (step S126). Then, the game is over, and accordingly, processing of the flow chart is ended.

In addition, if it is determined that the HPs 62 of all the enemy characters 42 have become '0' in step S121, the CPU 21 determines whether or not the stage No. 71 is '3' (step S127) If it is determined that the stage No. 71 is not '3', stages so far are cleared and a stage proceeds to the next stage. In this case, the CPU 21 transmits an instruction to the image processing unit 24 so that a screen showing that the stages so far have been cleared is displayed on the display device 14 (step S128).

Then, the CPU 21 grants a stage clear bonus to the player. The stage clear bonus is granted by making the HP 62 of each player character 41 recovered up to a predetermined level or increasing the capability value 53, for example. In addition, in the case when the player character 41 whose HP 62 has become '0' exists, it may be possible to make only one player character 41 revived and grant the HP 62 corresponding to a predetermined amount to the player character 41 (step S129). Thereafter, the CPU 21 increases the stage No. 71 by only '1' (step S130) In addition, information on the enemy character 42 in the next stage is registered in the enemy character table 60 of the RAM 23 (step S131), and then the process returns to processing in step S119.

In addition, if it is determined that the stage No. 71 is '3' in step S127, all stages are cleared and the player is determined to have completely won the battle. Accordingly, the CPU 21 transmits an instruction to the image processing unit 24 so that a screen showing that the player has won the battle is displayed on the display device 14 (step S132). Then, the game is over, and accordingly, processing of the flow chart is ended.

Figure 7B:
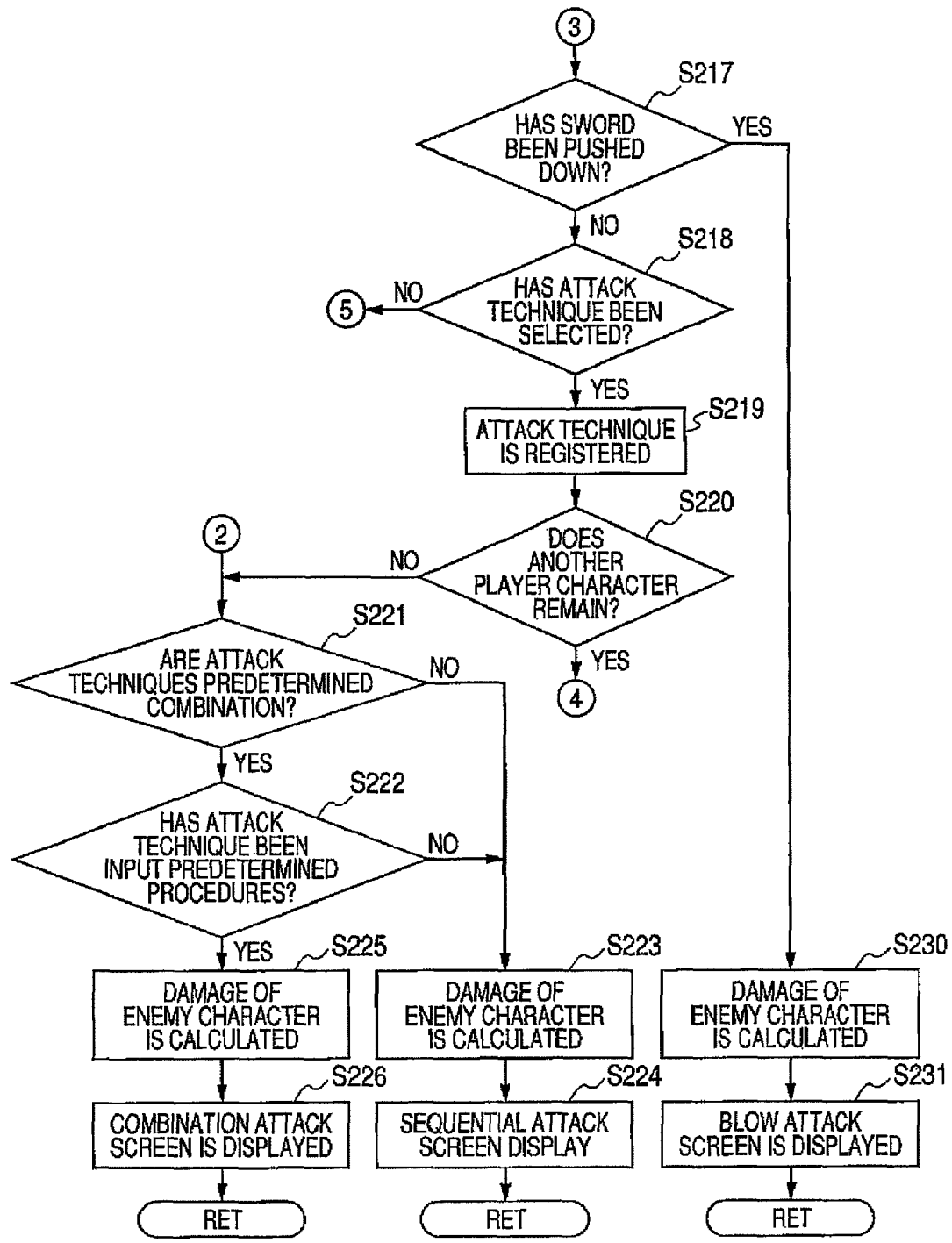
FIG. 7 is a flow chart illustrating player attack processing shown in FIG. 6 in detail.

FIG. 7 is a flow chart illustrating player attack processing of step S120 in detail. In the enemy attack processing, the CPU 21 first initializes all data (the courage point 72, the attack turn 73, and the call flag 74 are not temporary data described herein) on an attack of the player temporarily stored in the RAM 23 (step S201). Then, the CPU 21 determines whether or not a value of the courage point 72 is a predetermined value or more (step S202).

If it is determined that the value of the courage point 72 is the predetermined value or more, the CPU 21 reads the capability value 53, the attack technique A 55, and the attack technique B 56 regarding one (or the special character 43) of the player characters 41 registered in the player character table 50 in the sequential manner (step S203). The CPU 21 starts to check a selection time of the attack technique by using the internal timer (step S204). The CPU 21 randomly determines which one of the attack technique A 55 and the attack technique B 56 will be displayed on a right or left side (here, a case in which the process is returned from step S207 to be described later is excluded) and transmits an instruction to the image processing unit 24 so that the attack technique selection screen 14E is displayed on the display device 14. On the attack technique selection screen 14E, the length of the courage gauge 45 is decreased according to the check time of selection time of an attack technique (step S205).

Then, the CPU 21 determines whether or not the trading card 30 has been inserted into the card slot 13R and the code data 34 of the trading card 30 has been read. If it is determined that the code data 34 of the trading card 30 has been read, the CPU 21 determines whether or not the code data 34 indicates a special card (step S206). Here, in the case when the call flag 74 is already set, the CPU 21 disregards the code data 34 even if the code data 34 of the special card is read. When the code data 34 of the special card has been read, the process proceeds to processing in step S227.

When the code data 34 of the special card has not been read, the CPU 21 determines whether or not the player has selected an attack technique on the basis of whether or not the first player operation button 12*a* has been operated (step S207). If it is determined that the first player operation button 12*a* is not operated and the attack technique has not been selected yet, the process returns to processing in step S205.

If it is determined that the first player operation button 12*a* has been operated to select an attack technique, the CPU 21 temporarily stores an attack technique, which is displayed on an operation side of the left and right buttons, in the RAM 23 as an attack technique of the player character 41 (or the special character 43). In addition, operation procedures, such as repeated hits of the first player operation button 12*a*, are temporarily stored in the RAM 23.

In addition, the CPU 21 adds a point (three times the point in the case of the special character 43) corresponding to the length of the courage gauge 45 to the courage point 72 (step S208).

Then, the CPU 21 determines whether or not the player character 41 whose capability value 53, attack technique A 55, and attack technique B 56 are not yet read remains in the player character table 50 (step S209). If it is determined that the player character 41 whose capability value 53, attack technique A 55, and attack technique B 56 are not yet read remains, the CPU 21 returns to processing in step S203 in which the capability value 53, the attack technique A 55, and the attack technique B 56 regarding the next one player character 41 are read. If the player character 41 whose capability value 53, attack technique A 55, and attack technique B 56 are not yet read does not remain, the process proceeds to processing in step S221.

If it is determined that a value of the courage point 72 is the predetermined value or more in step S202, the CPU 21 determines whether or not the sword 17 has already risen up (step S210). If it is determined that the sword 17 has already risen up, the process proceeds to processing in step S212. If it is determined that the sword 17 has not risen up yet, the CPU 21 controls the sword driving unit 17D through the input and output control unit 26 such that the sword 17 rises upward (step S211). Then, the process proceeds to processing in step S212.

In step S212, the CPU 21 reads the capability value 53, the attack technique A 55, and the attack technique B 56 regarding one (or the special character 43) of the player characters 41 registered in the player character table 50 in the sequential manner. The CPU 21 randomly determines which one of the attack technique A 55 and the attack technique B 56 will be displayed on the right or left side (here, a case in which the process is returned from step S216 or S218 to be described later is excluded) and transmits an instruction to the image processing unit 24 so that the attack technique selection screen 14E is displayed on the display device 14 (step S213).

Then, the CPU 21 determines whether or not the trading card 30 has been inserted into the card slot 13R and the code data 34 of the trading card 30 has been read (step S214). If it is determined that the code data 34 of the trading card 30 has been read, the CPU 21 determined whether or not the code data 34 indicates a special card (step S215). Here, in the case when the call flag 74 is already set, the CPU 21 disregards the code data 34 even if the code data 34 of the special card is read.

If it is determined that the trading card 30 whose code data 34 has been read is not a special card, the CPU 21 temporarily stored the read code data 34 of the trading card 30 in the RAM 23. In the case when the previously read code data 34 is stored, the code data 34 that is read this time is overwritten in CPU 21 to be stored (step S216). Then, the process returns to processing in step S213. If it is determined that the trading card 30 whose code data 34 has been read is a special card, the process proceeds to processing in step S227.

In the case when the code data 34 of the trading card 30 has not been read yet, the CPU 21 determines whether or not the sword 17 that rises upward has been pushed down by the player on the basis of whether or not a detection signal of the sword driving unit 17D has been input (step S217). If it is determined that the sword 17 has been pushed down, the process proceeds to processing in step S230. If it is determined that the sword 17 has not been pushed down, the CPU 21 determines whether or not the player has selected an attack technique on the basis of whether or not the first player operation button 12*a* has been operated (step S218). If it is determined that the first player operation button 12*a* is not operated and the attack technique has not been selected yet, the process returns to processing in step S213.

If it is determined that the first player operation button 12*a* has been operated to select an attack technique, the CPU 21 temporarily stores an attack technique, which is displayed on an operation side of the left and right buttons, in the RAM 23 as an attack technique of the player character 41 (or the special character 43) (step S219).

Then, the CPU 21 determines whether or not the player character 41 whose capability value 53, attack technique A 55, and attack technique B 56 are not yet read remains in the player character table 50 (step S220). If it is determined that the player character 41 whose capability value 53, attack technique A 55, and attack technique B 56 are not yet read remains, the CPU 21 returns to processing in step S212 in which the capability value 53, the attack technique A 55, and the attack technique B 56 regarding the next one player character 41 are read. If the player character 41 whose capability value 53, attack technique A 55, and attack technique B 56 are not yet read does not remain, the process proceeds to processing in step S221.

In step S221, the CPU 21 determines whether or not the combination of selected attack techniques is a predetermined combination in a case when not an attack technique of the special character 43 but an attack technique of each of the three player characters 41 is selected (step S221) If it is determined that the combination of the selected attack techniques is the predetermined combination, the CPU 21 determines whether or not an operation based on predetermined procedures, such as repeated hits, has been performed on the first player operation button 12*a* when an attack technique is selected (step S222).

If it is determined that the combination of the selected attack techniques is not the predetermined combination or when the operation based on the predetermined procedures has not been performed even if the combination of the selected attack techniques is the predetermined combination, the CPU 21 calculates damage given to each of the enemy characters 42 in the case when the enemy character 42 has been attacked by using an attack technique selected for each of the player characters 41 (or the special character 43). The calculated damage given to the enemy character 42 is temporarily stored in the RAM 23 (step S223).

Then, the CPU 21 transmits an instruction to the image processing unit 24 so that a screen, which shows that the player character 41 (or the special character 43) is made to perform an attack by using an attack technique sequentially selected and the HP 62 of each of the enemy characters 42 is sequentially reduced due to the attack as much as the damage that has been calculated for each of the enemy characters 42 in step S223, is displayed on the display device 14 (step S224). Then, the player attack processing is ended, returning to the flow chart shown in FIG. 6.

If it is determined that the operation based on the predetermined procedures has been performed in step S222, the CPU 21 calculates damage given to each of the enemy characters 42 in the case when the enemy character 42 has been attacked by using a combination attack based on the combination of attack techniques selected for each of the player characters 41. The damage given to each of the enemy characters 42 by the combination attack is larger than that in a case in which the player character 41 performs the attack individually. The calculated damage given to the enemy character 42 is temporarily stored in the RAM 23 (step S225).

Then, the CPU 21 transmits an instruction to the image processing unit 24 so that a screen, which shows that the player character 41 is made to perform the combination attack by simultaneously using the combination of selected attack techniques and the HP 62 of each of the enemy characters 42 is reduced due to the combination attack as much as the damage that has been calculated for each of the enemy characters 42 in step S225, is displayed on the display device 14 (step S226). Then, the player attack processing is ended, returning to the flow chart shown in FIG. 6.

In step S227, the CPU 21 sets the call flag 74 since the call character 46 is called to attack the enemy character 42 (step S227). Then, CPU 21 calculates damage given to each of the enemy characters 42 when the enemy character 42 is attacked by the attack of the call character 46 that has been called. The calculated damage given to the enemy character 42 is temporarily stored in the RAM 23 (step S228).

Then, the CPU 21 transmits an instruction to the image processing unit 24 so that a screen, which shows that the player character 41 or the special character 43 calls the call character 46, the call character 46 is made to perform the attack, and the HP 62 of each of the enemy characters 42 is reduced due to the attack as much as the damage that has been calculated for each of the enemy characters 42 in step S228, is displayed on the display device 14 (step S229). Then, the player attack processing is ended, returning to the flow chart shown in FIG. 6.

In step S230, the CPU 21 calculates damage, which is given to each of the enemy characters 42 when the 'finishing blow' is given to the enemy character 42, corresponding to the code data 34 of the trading card 30 that is temporarily stored in the RAM 23 in step S216. Here, the calculated damage is damage enough to be able to necessarily reduce the HP 62 of each of the enemy characters 42 to '0' when any attack is performed with at least one, two, or three attack turns of the player other than the 'finishing blow' (it depends on the type of the trading card 30 which one of the one, two, or three attack turns will be needed). In an attack technique other than those described above, it is not possible to make the HP 62 of each of the enemy characters 42 '0' with four attack turns. In addition, the HP 52 of the player character 41 becomes necessarily '0' if the player character 41 is attacked by four attack turns of the computer processing. The calculated damage given to the enemy character 42 is temporarily stored in the RAM 23 (step S230).

Then, the CPU 21 transmits an instruction to the image processing unit 24 so that a screen, which shows that the player character 41 or the special character 43 gives the 'finishing blow' to each of the enemy characters 42 and the HP 62 of each of the enemy characters 42 is reduced due to the 'finishing blow' as much as the damage that has been calculated in step S230, is displayed on the display device 14 (step S231). Then, the player attack processing is ended, returning to the flow chart shown in FIG. 6.

On the other hand, in the enemy attack processing of step S123, the CPU 21 calculates damage given to each of the player characters 41 (or the special character 43) in the case when the player character 41 (or the special character 43) is attacked in the attack technique 65 that is registered for each of the enemy characters 42 in the enemy character table 60. The calculated damage of the player character 41 (or the special character 43) is temporarily stored in the RAM 23.

Then, the CPU 21 transmits an instruction to the image processing unit 24 so that a screen, which shows that the enemy character 42 is made to perform an attack by using the attack technique 65 sequentially registered and the HP 52 of each of the player characters 41 is sequentially reduced due to the attack as much as the damage that has been calculated for each of the player characters 41 (or the special character 43), is displayed on the display device 14. Then, the enemy attack processing is ended, returning to the flow chart shown in FIG. 6.

In addition, in the case when the two-person play is selected, two trading cards 30 may be discharged in step S101 and the processing of steps S103 to S108 may be performed for first and second players without performing the processing of steps S101 and S102. Player characters that are selected as a player character by each player may be displayed after selection of both the players has been completed. The second player is to operate the second player operation button 12*b* not the first player operation button 12*a*. The sword 17 is commonly used by the first and second players.

In addition, it may be determined which player will have an attack turn in step S119. In the player attack turn of step S120, a player character of the first player may be treated as the player character 41 described above and a player character of the second player may be treated as the enemy character 42 described above. Furthermore, in step S123, the player character of the second player may be treated as the player character 41 and the player character of the first player may be treated as the enemy character 42, such that the same player attack processing as that in step S120 is performed instead of the enemy attack processing.

In addition, in the case when different arcade game machines having the same configuration are connected with each other through a network and two players perform a battle play by using different machines, both of the players may finish the selection of the player characters 41 in steps S103 to S108 without performing the processing of step S101 and S102 and a player character selected by the player on the other party may be displayed when information indicating that the selection of the player characters 41 has been finished is exchanged between the two machines. In addition, as for the number of stages, only one stage may be applied. Even if only one stage is applied, the courage point 72 may be accumulated until the 'finishing blow' can be executed.

In addition, the player attack processing may be executed in the arcade game machine with which a player corresponding to an attack turn plays and the processing result may be notified to the other arcade game machine 1 that is connected through the network. In this case, a screen showing that his or her own player character is being attacked by the player character of the other party is displayed on the display device 14 in response to the notified processing result.

As described above, in the arcade game machine 1 according to the embodiment, the player character 41 that moves according to the operation of the player and the enemy character 42 fight against each other in a battle and attack the character of the other party alternately. In the attack turn of the player, the player selects an attack technique of each player character 41 (or the special character 43 that replaces the player character 41) with respect to the enemy character 42, but the courage gauge 45 is decreased according to the elapsed time until the attack technique is selected. A point corresponding to the length of the courage gauge 45 when the attack technique is selected is added to the courage point 72.

In addition, if a value of the added courage point 72 reaches a predetermined value at the time of a new attack turn of the player, the 'finishing blow' may be selected as the attack technique of the player character 41. In the case when the 'finishing blow' is selected as the attack technique, it is possible to give significant damage, which cannot be obtained by the other attack techniques, to each of the enemy characters 42 and to reduce the HP 62 of each of the enemy characters 42 at a stroke.

Thus, only a player, who has selected an attack technique of each player character 41 within a short period of time in each attack turn, can select the 'finishing blow' as an attack technique of the player character 41 in the attack turn of the player. That is, only a player who is excellent in decision of selection of an attack technique (selection time is short) as well as the player simply selects any attack technique as the attack technique of the player character 41 is advantageous in advancing a battle. Thus, selection of an attack technique of the player character 41 in one attack turn affects selection of an attack technique of the player character 41 in a next attack turn, and accordingly, fun of the game is increased.

In addition, since the selection of the attack technique of the player character 41 is performed by selection of the player to the last, the player's intention can be reflected in the selection itself and it is also possible to urge the player to select the attack technique in a positive way. For this reason, fun of the game is greatly improved without disregarding the player's intention like a case in which the attack technique is automatically selected when a predetermined time elapses.

In addition, since a player is urged to select the attack technique within a short period of time, it is expected that a period of time for which the progress of a battle is actually stopped while simply waiting for the player's selection of the attack technique of the player character 41 will become short. Accordingly, in the case when there is a person waiting for a turn of the game, a situation in which the waiting time of the person waiting for the turn is increased while the progress of the game is substantially stopped does not occur. Particularly in a game machine allowing many and unspecified persons to play like the arcade game machine 1 according to the embodiment, many persons may wait for the game, the effect described above becomes noticeable.

Here, the courage point 72 is not added separately for each of the three player characters 41 but is added commonly for all of the player characters 41. Accordingly, it is possible to urge a player to quickly select attack techniques of all of the three player characters 41. As a result, in the case when there is a person waiting for a turn of the game, a situation in which the waiting time of the person waiting for the turn is increased while the progress of the game is substantially stopped does not occur.

In addition, the player character 41 that performs a battle against the enemy character 42 is selected by the player by causing the code data 34 of the trading card 30 on hand to be read before the start of the battle. Thus, even before the start of a battle, it is possible to give pleasure of selection of the player character 41 to a player. In addition, since the number of characters that can appear as the player character 41 is increased as types of the trading cards 30 on hand are increased, it is possible to give not only the pleasure of playing a game but also pleasure of collecting the trading cards 30.

Here, an initial value of the HP 52 of each player character 41 is increased according to the combination of the player character 41 that the player has selected. In addition, by selecting characters having the same attributes 54 as the three player characters 41, it is possible to cause the special character 43 to participate in a battle in a condition of a predetermined operation. For this reason, fun when the player selects the player character 41 is increased. Moreover, since the player should possess predetermined kinds of trading cards 30 beforehand in order to make those described above possible, the pleasure of collecting the trading cards 30 is further increased.

In addition, when the courage point 72 reaches a predetermined value and the 'finishing blow' can be executed, not only the 'finishing blow' is simply displayed on the display device 14 in the same manner as the selection of the other attack techniques but also the sword 17 rises up. An operation when the player selects the 'finishing blow' as the attack technique is assumed to push down the sword 17. Accordingly, it becomes easy to give to a player an impression that the 'finishing blow' is a special thing which is different from the other attack techniques. Furthermore, in the case of a game machine that is not universal and allows many and unspecified persons, which are not players, to observe a game like the arcade game machine 1, it is easy to adopt such special structure. In addition, due to the special structure, the progress of a game can be dynamically expressed.

In the case when the player has selected the 'finishing blow' as an attack technique, if the code data 34 of the trading card 30 is read by the scanner 13, damage given to the enemy character 42 by the 'finishing blow' changes with the type of the trading card 30 whose code data 34 is read. Accordingly, since fun when the player selects the 'finishing blow' as the attack technique is increased, the pleasure of collecting the trading cards 30 is further increased.

In addition, in the case when attack techniques selected for the three player characters 41 in an attack turn of a player is a predetermined combination and operation procedures of the first player operation button 12a at the time of selecting the attack technique is predetermined procedures, the three player characters 41 do not make an individual attack on the enemy character 42 but makes a combination attack on the enemy character 42 at a time on the basis of the combination of the selected attack techniques. In addition, the damage given to the enemy character 42 due to the combination attack is more serious than the individual attack.

Thus, since the combination attack allowing the three player characters 41 to function as one body is possible, fun caused by existence of the plurality of kinds of player characters 41 fighting against the enemy character 42 is increased. Furthermore, since the operation procedures of the first player operation button 12a for performing the combination attack have also conditions, a player also takes an interest in memorizing the operation procedures. Furthermore, the operation procedures for making a combination attack may change with the combination of the three player characters 41 or other conditions.

Furthermore, if a player has a special card, it is possible to call the call character 46 so as to cause the call character 46 to make an attack on the enemy character 42 by causing the scanner 13 to read the code data 34 of the special card in an attack turn of the player. For this reason, when collecting the trading card 30, a player is also interested in obtaining a special card. Accordingly, the pleasure of collecting the trading card 30 is further increased. Above all, since the call character 46 can be called only once in a game having three stages by using the special card, a strategic point in a game is improved by selecting an attack turn in which the special card is used. As a result, fun of the game is further increased.

Moreover, in the arcade game machine 1 according to the embodiment, it is possible to perform one game with one coin insertion. The one game is configured to include first to third stages and is ended as winning of the player when all HPs 62 of the enemy characters 42 become '0' at the third stage. On the other hand, if all HPs 52 of the player characters 41 (or the special character 43) become '0' at any of the stages before all HPs 62 of the enemy characters 42 become '0', the game is ended as defeat of the player. That is, even though the first to third stages are prepared in one game, the game may be ended without clearing the third stage or even a stage before the third stage.

Here, the courage point 72 is added regardless of a stage. In addition, the courage point 72 does not reach a predetermined value at the second stage regardless of the speed of selection of the attack technique. In addition, as long as the courage point 72 does not reach the predetermined value, it is not possible to clear the third stage by making the HPs 62 of all enemy characters 42 '0' at the third stage. Accordingly, since it is necessary to make a quick selection of an attack technique from the first stage also in order to clear the third stage, the game does not have completely independent stages but a stage progressing game in which the first and second stages progress toward the third stage is realized. As a result, a high-level game in which all stages are connected with each other can be realized.

In addition, since it is possible to make the third stage, which is a final stage of one game, more exciting than the first and second stages by setting the third stage differently from the first and second stages, fun of the game can be further increased. In addition, even in the case in which a game is ended by performing the game to the last of the third stage with one coin insertion (that is, clearing the third stage), the game may be ended before being performed to the last of the third stage. Thus, it becomes possible to urge the player to quickly select an attack technique of each player character 41 in each attack turn of the player from the first stage.

Furthermore, in the arcade game machine 1 according to the embodiment, not only a one-person play in which the player character 41 moving in accordance with an operation of a player is made to fight against the enemy character 42 controlled by computer processing but also a two-person play in which two players cause player characters, which are selected by the players, to fight against each other become possible. In addition, an online battle against another arcade game machine that has the same configuration and is connected to the arcade game machine 1 through a network may be performed. In the case of the online battle, one player can also perform a battle against a player located at a remote place. Accordingly, since a battle play between friends or unknown persons becomes possible, the fun of a game is further increased.

The invention is not limited to the embodiment described above but various modifications and applications thereof may be made. Hereinafter, modifications of the embodiment applicable to the invention will be described.

In the embodiment, the case in which a game is configured to include the first to third stages has been described as an example. However, the number of stages is arbitrary. Moreover, in the case when there is a plurality of stages, it is preferable to set such that the courage point 72 does not reach a predetermined value as long as a stage does not reach a final stage or the final stage cannot be cleared as long as the courage point 72 does not reach the predetermined value to execute the 'finishing blow'.

In the embodiment described above, an attack using the call character 46, which can be made by reading a special card in a game that can be executed with one coin insertion, could be performed only once. However, the invention is not limited thereto. In addition, it is preferable to limit the number of times of such attacks to a predetermined number. In addition, a condition that allows the special character 43 to participate in a battle instead of the three player characters 41 has been limited to a case in which the player characters 41 selected by reading of the trading card 30 have the same attribute. However, even if the player characters 41 do not have the same attribute, it may be possible to make the special character 43 participate in the battle at the time of a combination of predetermined attributes. In addition, even in the case when types of the selected player characters 41 other than the condition of attributes are based on a predetermined combination set beforehand, it is possible to make the enemy character 42 appear instead of the three player characters 41.

In the embodiment described above, the trading card 30 is discharged before the start of a game in the arcade game machine 1, such that the new trading card 30 is provided to a player. However, the time at which the new trading card 30 is provided to the player is not limited to a point of time before performing the game, but the trading card 30 may be provided after the game is ended. In this case, different kinds of cards may be provided according to a result of the game. For example, predetermined kinds of trading cards 30 may be provided at a high rate when the game is ended as winning of the player, or predetermined kinds of trading cards 30 may be provided only when the game is ended as winning of the player.

In the embodiment, the case in which the invention is applied to the arcade game machine 1 that uses the trading card 30 has been described as an example. However, the invention may also be applied to games in which a player character moving in accordance with an operation of a player and an enemy character are made to fight against each other and the player is made to select an attack technique of the player character when the player character makes an attack on the enemy character without using the trading card 30. The number of player characters and the number of enemy characters are not limited to '3', respectively, but may be an arbitrary number of one or more. The number of player characters and the number of enemy characters fighting against the player characters may be different from each other. In addition, the invention may be applied to not only a game in which an attack turn of a player character and an attack turn of an enemy character change alternately, that is, a turn system is adopted but also a game in which the attack turn of the player character or the attack turn of the enemy character is changed when a predetermined time set for each of the turns elapses, that is, an active time battle is adopted.

In addition, a computer device by which the invention is embodied and which is used as a platform that performs a game is not limited to the arcade game machine 1 described above. For example, a non-portable home video game machine, a portable game machine, a personal computer, or a mobile phone having an application executing function may also be applied. Even in the case when the non-portable home video game machine, the portable game machine, the personal computer, or the mobile phone having an application executing function is applied as a platform, the non-portable home video game machine, the portable game machine, the personal computer, and the mobile phone having the application executing function may be connected with each other through a network, such as Internet, or through infrared wireless communications such that two person can perform a battle play.

In addition, in the case when such highly common computer devices are applied as the platform, the sword 17 cannot be used at the time of exercising the 'finishing blow' unless a highly common input device is also used. For this reason, it is necessary to consider an alternative method. As a method of selecting execution of the 'finishing blow', a simple key operation or an operation of a pointing device may be applied.

Here, in the case when a computer device by which the invention is embodied and which is used as a platform that performs a game includes a touch panel, selection of an attack technique other than the 'finishing blow' is performed by means of a button operation, touch of a touch panel, and the like. However, when the 'finishing blow' can be executed, the execution of the 'finishing blow' may be instructed by displaying, for example, a sword image on a display device provided on a back surface of the touch panel and touching the sword image with a touch pen or the like.

Furthermore, in the case when the computer device by which the invention is embodied and which is used as a platform that performs a game includes a control pad having a multi-axis acceleration sensor, selection of an attack technique other than the 'finishing blow' is performed by means of an operation of a button provided on the control pad. However, when the 'finishing blow' can be executed, the player may instruct the execution of the 'finishing blow' by shaking or projecting the control pad, for example.

In the embodiment described above, a program and data used to execute a game to which the invention is applied are stored beforehand in the ROM 22 of the arcade game machine 1. In addition, when a non-portable or portable game machine, a personal computer, or the like is applied as a platform for realizing the invention, a semiconductor memory card, optical and/or magnetic disks (for example, a flexible disk, a CD-ROM, and a DVD-ROM) may be applied for such program and data in accordance with the type of a computer device used as a platform. In the case when a computer device including a fixed disk device is used as a platform, the computer device may be distributed in a state in which such program and data are stored beforehand in the fixed disk device.

In addition, in the case when a computer device that can communicate with another computer device through a network (including the arcade game machine 1 according to the embodiment described above) is applied as a platform, such program and data may be distributed through the network in a state in which the program and data are stored in a fixed disk device provided in a server device existing on the network. In the case of the arcade game machine 1 according to the embodiment described above, it is preferable to apply a flash memory or the like as the ROM 22.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A game apparatus that executes a game, in which a player character moving according to instructions of a player and an enemy character fight against each other and the character of a winning party reduces a predetermined parameter set for the character of an opposing party to a predetermined value by an attack, the game apparatus comprising:
    an attack turn determiner that determines whether one of the player character and the enemy character has an attack turn;
    an enemy attacker that causes the enemy character to make an attack on the player character when the attack turn determiner determines that the enemy character has an attack turn, so that a predetermined parameter of the player character is reduced in accordance with the attack;
    an attack technique selector that receives, from the player, a selection of a desired attack technique from a plurality of types of attack techniques provided as attack techniques of the player character when the attack turn determiner determines that the player character has the attack turn;
    a player attacker that causes the player character to make an attack on the enemy character by the use of the desired attack technique received by the attack technique selector so that a predetermined parameter of the enemy character is reduced due to the attack;
    a time gauge that gauges an elapsed time from when the attack turn determiner determines that the player character has the attack turn until when the attack technique selector receives the selection of the desired attack technique;
    a selection time value accumulator that accumulates a selection time value based on the elapsed time each time that the time gauge gauges the elapsed time; and
    a special attack selector that enables the selection of a special attack, which causes an amount of reduction in a predetermined parameter of the enemy character to be larger than that in the case of the attack techniques, to be received by the attack technique selector as the desired attack technique of the player character when the selection time value accumulated by the selection time value accumulator exceeds a predetermined value.

2. The game apparatus according to claim 1, further comprising:
    a member projection controller that projects a predetermined member, which is disposed in a housing of the game apparatus and is inserted by an operation of a player, when the selection time value accumulated by the selection time value accumulator exceeds the predetermined value, wherein the special attack selector selects the special attack as an attack technique of the player upon insertion of a predetermined member projected from the housing by the member projection controller.

3. The game apparatus according to claim 1, further comprising:
a card information reader that reads information written in a card selected by the player from cards, which are owned by the player, among a plurality of types of cards provided with information on one of a plurality of types of characters that are used as the player character; and
a player character setter that sets a character, which corresponds to information read from the card by the card information reader, as a player character to fight against the enemy character in the game.

4. The game apparatus according to claim 3,
wherein the special attack selector comprises a reading controller at a time of a special attack that causes the card information reader to read information written in the selected card, which is owned by the player, when selecting the special attack, and
the player attacker reduces a predetermined parameter of the enemy character in accordance with information read from the card by the card information reader at the time of selection of the special attack, when the special attack is selected as an attack technique of the player.

5. The game apparatus according to claim 3,
wherein the plurality of types of cards include a special card that allows the player character to make an attack based on an attack technique, which cannot be selected by the attack technique selector, including the special attack by causing the card information reader to read written information when it is determined that the player character has an attack turn,
the attack technique selector selects an attack technique corresponding to information written in the special card up to a predetermined number of attack turns of the player character until the game is ended, and
the player attacker makes an attack against the enemy character in accordance with information read from the special card when the information written in the special card has been read by the card information reader, when it is determined that the player character has an attack turn.

6. The game apparatus according to claim 1,
wherein the game has one or more stages from a first stage to an n-th stage and the player character fights against different enemy characters for each of the stages,
the selection time value accumulator accumulates the selection time value from the first stage even when a current stage proceeds to a subsequent stage,
a predetermined parameter of one of the different enemy characters that fights against the player character at the n-th stage is reduced up to the predetermined value only when the special attack is received as the desired attack technique of the player character by the special attack selector, and
'n' is an integer equal to or larger than 1.

7. The game apparatus according to claim 1,
wherein the game has a plurality of stages from a first stage to an n-th stage and the player character fights against different enemy characters for each of the stages,
wherein the selection time value accumulator does not accumulate the selection time value up to a predetermined value, which allows the special attack to be the selection, until the (n−1)-th stage, regardless of the elapsed time in each attack turn of the player character,
wherein a predetermined parameter of one of the different enemy characters that fights against the player character at the n-th stage is reduced up to the predetermined value only when the special attack is received as the desired attack technique of the player character by the special attack selector, and
wherein 'n' is an integer at least equal to 2.

8. The game apparatus according to claim 6, further comprising:
a charger that charges a predetermined fee at a start of the game,
wherein, by a one-time charging of the charger, the game is performed until one of a predetermined parameter of the player character is reduced to the predetermined value and a predetermined parameter of the enemy character is reduced to the predetermined value at the n-th stage.

9. The game apparatus according to claim 1,
wherein a plurality of player characters capable of fighting against the enemy character are in the game,
the attack technique selector causes the player to sequentially select an attack technique of each of the plurality of player characters when the attack turn determiner determines that the player character has an attack turn, and
the selection time value accumulator accumulates the selection time value in common with the plurality of player characters.

10. The game apparatus according to claim 9, further comprising:
a player character selector that selects, according to instructions from the player at the start of the game, a plurality of player characters to fight against the enemy character.

11. The game apparatus according to claim 10, further comprising:
a parameter initial value changer that, when a combination of a plurality of player characters selected by the player character selector is a predetermined combination, changes an initial value of a predetermined parameter of at least one of the plurality of player characters selected at the start of the game.

12. The game apparatus according to claim 11,
wherein a predetermined attribute and an initial value of the predetermined parameter are set for each of the plurality of player characters, and
the parameter initial value changer changes an initial value of a predetermined parameter of at least one of the plurality of selected player characters at the start of the game when a combination of predetermined attributes of a plurality of player characters selected by the player character selector is a predetermined combination.

13. The game apparatus according to claim 10, further comprising:
a special character fighter that causes a special character to fight against the enemy character instead of the plurality of selected player characters according to an instruction from the player when a combination of the plurality of player characters selected by the player character selector is a predetermined combination.

14. The game apparatus according to claim 13,
wherein a predetermined attribute is set for each of the plurality of player characters, and
the special character fighter causes the special character to fight against the enemy character according to an instruction from the player, when a combination of attributes of the plurality of player characters selected by the player character selector is a special combination.

15. The game apparatus according to claim 9,
wherein the attack technique selector selects a combination of attack techniques set for the plurality of player characters by inputting an instruction in predetermined procedures without sequentially selecting the attack techniques of the plurality of player characters when the attack turn determiner determines that the player character has an attack turn, and the player attacker makes an attack on the enemy character on the basis of a combination of attack techniques set for the plurality of player characters and reduces a predetermined parameter of the enemy character by using a different standard from when attack techniques with respect to the respective player characters are sequentially selected, when the attack is made on the enemy character using the combination of attack techniques.

16. The game apparatus according to claim 1,
wherein the game apparatus is connected for communication with another game apparatus capable of executing the game, and the enemy character is a player character, which is operated by another player, in another game apparatus connected to the game apparatus.

17. A method of advancing a game which is executed in a computer comprising an input that inputs instructions of a player, a storage that stores information required to advance the game, a processor that performs processing for advancing the game, and a display that displays an image of the game and in which a player character moving according to the instructions of a player and an enemy character fight against each other, comprising:

granting an attack turn to one of the player character and the enemy character by processing of the processor in accordance with a game progress;

displaying an image, indicating that the enemy character makes an enemy attack on the player character by processing of the processor, and reducing a predetermined parameter of the player character stored as information in the storage in response to the enemy attack when the enemy character has the attack turn;

receiving, from the player, a selection of a desired attack technique from a plurality of types of attack techniques, which are set as attack techniques of the player character by processing of the processor, through the input when the player character has the attack turn;

displaying an image, indicating that the player character makes a player attack on the enemy character by using the desired attack technique that is received via the input by processing of the processor, and reducing a predetermined parameter of the enemy character stored as information in the storage in response to the player attack;

gauging an elapsed time from when the player character is granted the attack turn until when the desired attack technique of the player character is received via the input;

accumulating a selection time value based on the elapsed time each time that the elapsed time is gauged;

enabling a special attack, which reduces a predetermined parameter of the enemy character by an amount larger than that of the attack techniques by processing of the processor, to be selected as the desired attack technique of the player character when the player character has the attack turn and when the selection time value exceeds a predetermined value;

displaying an indication of winning of the enemy character on the display when a predetermined parameter set for the player character has been reduced to a predetermined value by the enemy attack of the enemy character against the player character by processing of the processor; and displaying an indication of winning of the player character on the display when a predetermined parameter set for the enemy character has been reduced to a predetermined value by the player attack of the player character against the enemy character by processing of the processor.

18. A non-transitory computer readable storage medium on which a program is recorded that causes a computer to execute a game in which a player character, moving according to instructions of a player, and an enemy character fight against each other and the character of a winning party reduces a predetermined parameter set for the character of an opposing party to a predetermined value by an attack, the program causing the computer to execute:

determining whether one of the player character and the enemy character has an attack turn;

causing the enemy character to make an enemy attack on the player character when it is determined that the enemy character has the attack turn, so that a predetermined parameter of the player character is reduced in accordance with the enemy attack;

receiving a selection of a desired attack technique from a plurality of types of attack techniques provided as attack techniques of the player character when it is determined that the player character has the attack turn;

causing the player character to make an attack on the enemy character based on the desired attack technique when the selection is received so that a predetermined parameter of the enemy character is reduced in accordance with the player attack;

gauging an elapsed time from when it is determined that the player character has the attack turn until when the selection of the desired attack technique of the player character is received;

accumulating a selection time value based on the elapsed time each time that the elapsed time is gauged; and enabling a special attack, which reduces a predetermined parameter of the enemy character by an amount larger than that of the attack techniques, to be selected as the desired attack technique of the player character when the selection time value exceeds a predetermined value.

* * * * *